United States Patent
Zhamu et al.

(10) Patent No.: US 10,720,669 B2
(45) Date of Patent: *Jul. 21, 2020

(54) MANUFACTURING METHOD FOR ALKALI METAL-SELENIUM SECONDARY BATTERY CONTAINING A CATHODE OF PROTECTED SELENIUM

(71) Applicant: Global Graphene Group, Inc., Dayton, OH (US)

(72) Inventors: Aruna Zhamu, Springboro, OH (US); Bor Z. Jang, Centerville, OH (US)

(73) Assignee: Global Graphene Group, Inc., Dayton, OH (US)

( * ) Notice: Subject to any disclaimer, the term of this patent is extended or adjusted under 35 U.S.C. 154(b) by 95 days.

This patent is subject to a terminal disclaimer.

(21) Appl. No.: 15/952,544

(22) Filed: Apr. 13, 2018

(65) Prior Publication Data

US 2019/0319297 A1    Oct. 17, 2019

(51) Int. Cl.
| | |
|---|---|
| *H01M 10/058* | (2010.01) |
| *H01M 10/0525* | (2010.01) |
| *H01M 4/136* | (2010.01) |
| *H01M 10/054* | (2010.01) |
| *H01M 4/38* | (2006.01) |
| *H01M 4/36* | (2006.01) |
| *H01M 4/62* | (2006.01) |
| *H01M 4/58* | (2010.01) |
| *H01M 4/587* | (2010.01) |
| *H01M 4/02* | (2006.01) |

(52) U.S. Cl.
CPC ......... *H01M 10/058* (2013.01); *H01M 4/366* (2013.01); *H01M 4/38* (2013.01); *H01M 4/581* (2013.01); *H01M 4/587* (2013.01); *H01M 4/5825* (2013.01); *H01M 4/622* (2013.01); *H01M 10/054* (2013.01); *H01M 10/0525* (2013.01); *H01M 2004/028* (2013.01)

(58) Field of Classification Search
None
See application file for complete search history.

(56) References Cited

PUBLICATIONS

Kundu et al. (Journal of Power Sources 236 '2013' 112-117). (Year: 2013).*

(Continued)

*Primary Examiner* — Wojciech Haske

(57) ABSTRACT

Provided is a method of manufacturing a rechargeable alkali metal-selenium cell, comprising: (a) providing a cathode and an optional cathode current collector to support the cathode; (b) providing an alkali metal anode and an optional anode current collector to support said anode; and (c) providing an electrolyte in contact with the anode and the cathode and an optional separator electrically separating the anode and the cathode; wherein the cathode contains multiple particulates of a selenium-containing material wherein at least one of the particulates comprises one or a plurality of selenium-containing material particles being embraced or encapsulated by a thin layer of a high-elasticity polymer having a recoverable tensile strain from 5% to 1,000% when measured without an additive or reinforcement, a lithium ion conductivity no less than $10^{-7}$ S/cm at room temperature, and a thickness from 0.5 nm to 10 μm.

17 Claims, 11 Drawing Sheets

(56) References Cited

PUBLICATIONS

An et al., "Diameter-Selected Synthesis of Single Crystalline Trigonal Selenium Nanowires" Materials Chemistry and Physics (2007) vol. 101, No. 2-3, pp. 357-361.

An et al. "Large-Scale Synthesis of High Quality Trigonal Selenium Nanowires" European Journal of Inorganic Chemistry (2003) vol. 17, pp. 3250-3255.

Chen et al., "Selenium nanowires and nanotubes synthesized via a facile template-free solution method" Materials Research Bulletin (2010) vol. 45, pp. 699-704.

Dwivedi et al., "An Organic Acid-induced Synthesis and Characterization of Selenium Nanoparticles" Journal of Nanotechnology (2011) Article ID 651971, 6 pages.

Fan et al., "Hollow selenium encapsulated into 3D graphene hydrogels for lithium-selenium batteries with high rate performance and cycling stability" RSC Adv. (2017) vol. 7, pp. 21281-21286.

Gao et al., "Hollow Sphere Selenium Nanoparticles: Their In-Vitro Anti Hydroxyl Radical Effect" Advanced Materials (2002), vol. 14, No. 4, pp. 290-293.

Karlicky et al., "Halogenated Graphenes: Rapidly Growing Family of Graphene Derivatives" ACS Nano (2013) vol. 7, No. 8, pp. 6434-6464.

Li et al., "Mixed Surfactant Template Method for Preparation of Nanometer Selenium" E-Journal of Chemistry (2009) vol. 6, No. S1, pp. S304-S310.

Lin et al., "Observation in the Growth of Selenium Nanoparticles" Journal of Chinese Chemical Society (2004) vol. 51, No. 2, pp. 239-242.

Luesakul et al., "Shape-controlled synthesis of cubic-like selenium nanoparticles via the self-assembly method" Carbohydrate Polymers (2016) vol. 153, pp. 435-444.

Zeng et al., "Solvothermal synthesis of trigonal selenium with butterfly-like microstructure" Particuology (2013) vol. 11, No. 5, pp. 614-617.

Zhang et al., "Synthesis of selenium nanoparticles in the presence of polysaccharides" Materials Letters (2004) vol. 58, No. 21, pp. 2590-2594.

\* cited by examiner

MANUFACTURING METHOD FOR ALKALI METAL-SELENIUM SECONDARY BATTERY CONTAINING A CATHODE OF PROTECTED SELENIUM

FIELD OF THE INVENTION

The present invention is related to a unique cathode composition and cathode structure in a secondary or rechargeable alkali metal-selenium battery, including the lithium-selenium battery, sodium-selenium battery, and potassium-selenium battery, and a method of producing same.

BACKGROUND

Rechargeable lithium-ion (Li-ion) and lithium metal batteries (including Li-sulfur, Li-selenium, and Li metal-air batteries) are considered promising power sources for electric vehicle (EV), hybrid electric vehicle (HEV), and portable electronic devices, such as lap-top computers and mobile phones. Lithium as a metal element has the highest capacity (3,861 mAh/g) compared to any other metal or metal-intercalated compound as an anode active material (except $Li_{4.4}Si$, which has a specific capacity of 4,200 mAh/g). Hence, in general, Li metal batteries have a significantly higher energy density than lithium ion batteries.

Historically, rechargeable lithium metal batteries were produced using non-lithiated compounds having relatively high specific capacities, such as $TiS_2$, $MoS_2$, $MnO_2$, $CoO_2$, and $V_2O_5$, as the cathode active materials, which were coupled with a lithium metal anode. When the battery was discharged, lithium ions were transferred from the lithium metal anode through the electrolyte to the cathode, and the cathode became lithiated. Unfortunately, upon repeated charges/discharges, the lithium metal resulted in the formation of dendrites at the anode that ultimately grew to penetrate through the separator, causing internal shorting and explosion. As a result of a series of accidents associated with this problem, the production of these types of secondary batteries was stopped in the early 1990's, giving ways to lithium-ion batteries.

In lithium-ion batteries, pure lithium metal sheet or film was replaced by carbonaceous materials as the anode. The carbonaceous material absorbs lithium (through intercalation of lithium ions or atoms between graphene planes, for instance) and desorbs lithium ions during the re-charge and discharge phases, respectively, of the lithium ion battery operation. The carbonaceous material may comprise primarily graphite that can be intercalated with lithium and the resulting graphite intercalation compound may be expressed as $Li_xC_6$, where x is typically less than 1.

Although lithium-ion (Li-ion) batteries are promising energy storage devices for electric drive vehicles, state-of-the-art Li-ion batteries have yet to meet the cost and performance targets. Li-ion cells typically use a lithium transition-metal oxide or phosphate as a positive electrode (cathode) that de/re-intercalates $Li^+$ at a high potential with respect to the carbon negative electrode (anode). The specific capacity of lithium transition-metal oxide or phosphate based cathode active material is typically in the range from 150-180 mAh/g. As a result, the specific energy of commercially available Li-ion cells is typically in the range from 120-240 Wh/kg, most. These specific energy values are two to three times lower than what would be required for battery-powered electric vehicles to be widely accepted.

With the rapid development of hybrid (HEV), plug-in hybrid electric vehicles (HEV), and all-battery electric vehicles (EV), there is an urgent need for anode and cathode materials that provide a rechargeable battery with a significantly higher specific energy, higher energy density, higher rate capability, long cycle life, and safety. Two of the most promising energy storage devices are the lithium-sulfur (Li—S) cell and lithium-selenium (Li—Se) cell since the theoretical capacity of Li is 3,861 mAh/g, that of S is 1,675 mAh/g, and that of Se is 675 mAh/g. Compared with conventional intercalation-based Li-ion batteries, Li—S and Li—Se cells have the opportunity to provide a significantly higher energy density (a product of capacity and voltage). Having a significantly higher electronic conductivity as compared to S, Se is a more effective cathode active material and, as such, Li—Se potentially can exhibit a higher rate capability.

However, Li—Se cell is still plagued with several major technical problems that have hindered its widespread commercialization:

(1) All prior art Li—Se cells have dendrite formation and related internal shorting issues;

(2) The cell tends to exhibit significant capacity decay during discharge-charge cycling. This is mainly due to the high solubility of selenium and lithium polyselenide anions formed as reaction intermediates during both discharge and charge processes in the polar organic solvents used in electrolytes. During cycling, the anions can migrate through the separator to the Li negative electrode whereupon they are reduced to solid precipitates and cannot return to the cathode, causing active mass loss. This phenomenon is commonly referred to as the Shuttle Effect. This process leads to several problems: high self-discharge rates, loss of cathode capacity, corrosion of current collectors and electrical leads leading to loss of electrical contact to active cell components, fouling of the anode surface giving rise to malfunction of the anode, and clogging of the pores in the cell membrane separator which leads to loss of ion transport and large increases in internal resistance in the cell.

(3) Presumably, nanostructured mesoporous carbon materials could be used to hold the Se or lithium polyselenide in their pores, preventing large out-flux of these species from the porous carbon structure through the electrolyte into the anode. However, the fabrication of the proposed highly ordered mesoporous carbon structure requires a tedious and expensive template-assisted process. It is also challenging to load a large proportion of selenium into the mesoscaled pores of these materials using a physical vapor deposition or solution precipitation process. Typically the maximum loading of Se in these porous carbon structures is less than 50% by weight (i.e. the amount of active material is less than 50%; more than 50% being inactive materials).

Despite the various approaches proposed for the fabrication of high energy density Li—Se cells, there remains a need for cathode materials, production processes, and cell operation methods that retard the out-diffusion of Se or lithium polyselenide from the cathode compartments into other components in these cells, improve the utilization of electro-active cathode materials (Se utilization efficiency), and provide rechargeable Li—Se cells with high capacities over a large number of cycles.

Most significantly, lithium metal (including pure lithium, lithium alloys of high lithium content with other metal elements, or lithium-containing compounds with a high lithium content; e.g. >80% or preferably >90% by weight Li) still provides the highest anode specific capacity as compared to essentially all other anode active materials (except pure silicon, but silicon has pulverization issues). Lithium metal would be an ideal anode material in a lithium-selenium secondary battery if dendrite related issues could be addressed.

Sodium metal (Na) and potassium metal (K) have similar chemical characteristics to Li and the selenium cathode in sodium-selenium cells (Na—Se batteries) or potassium-selenium cells (K—Se) face the same issues observed in Li—S batteries, such as: (i) low active material utilization rate, (ii) poor cycle life, and (iii) low Coulumbic efficiency. Again, these drawbacks arise mainly from insulating nature of Se, dissolution of polyselenide intermediates in liquid electrolytes (and related Shuttle effect), and large volume change during repeated charges/discharges.

Hence, an object of the present invention is to provide a rechargeable Li—Se battery that exhibits an exceptionally high specific energy or high energy density. One particular technical goal of the present invention is to provide a Li metal-selenium or Li ion-selenium cell with a cell specific energy greater than 300 Wh/kg, preferably greater than 350 Wh/kg, and more preferably greater than 400 Wh/kg (all based on the total cell weight).

It may be noted that in most of the open literature reports (scientific papers) and patent documents, scientists or inventors choose to express the cathode specific capacity based on the selenium or lithium polyselenide weight alone (not the total cathode composite weight), but unfortunately a large proportion of non-active materials (those not capable of storing lithium, such as conductive additive and binder) is typically used in their Li—Se cells. For practical use purposes, it is more meaningful to use the cathode composite weight-based capacity value.

A specific object of the present invention is to provide a rechargeable lithium-selenium or sodium-selenium cell based on rational materials and battery designs that overcome or significantly reduce the following issues commonly associated with conventional Li—Se and Na—Se cells: (a) dendrite formation (internal shorting); (b) low electric and ionic conductivities of selenium, requiring large proportion (typically 30-55%) of non-active conductive fillers and having significant proportion of non-accessible or non-reachable selenium, or lithium or sodium polyselenide); (c) dissolution of lithium polyselenide or sodium polyselenide in electrolyte and migration of dissolved lithium/sodium polyselenide from the cathode to the anode (which irreversibly react with lithium/sodium at the anode), resulting in active material loss and capacity decay (the shuttle effect); and (d) short cycle life.

SUMMARY OF THE INVENTION

The present invention provides an alkali metal-selenium cell (e.g. lithium-selenium cell, sodium-selenium cell, and potassium-selenium cell). The alkali metal-selenium cell comprises (a) an anode active material layer and an optional anode current collector supporting the anode active material layer; (b) a cathode active material layer and an optional cathode current collector supporting the cathode active material layer; and (c) an electrolyte with an optional porous separator layer in ionic contact with the anode active material layer and the cathode active material layer; wherein the cathode active material layer contains multiple particulates of a selenium-containing material selected from a selenium-carbon hybrid, selenium-graphite hybrid, selenium-graphene hybrid, conducting polymer-selenium hybrid, a metal sulfide, a Se alloy or mixture with Sn, Sb, Bi, S, or Te, a selenium compound, or a combination thereof and wherein at least one of the particulates is composed of one or a plurality of the selenium-containing material particles being embraced or encapsulated by a thin layer of a high-elasticity polymer having a recoverable tensile strain no less than 10% when measured without an additive or reinforcement, a lithium ion conductivity no less than $10^{-7}$ S/cm (typically from $10^{-5}$ S/cm to $5 \times 10^{-2}$ S/cm, measured at room temperature), and a thickness from 0.5 nm to 10 μm (typically from 1 nm to 1 μm, but preferably <100 nm and more preferably <10 nm).

The selenium-carbon hybrid, selenium-graphite hybrid, selenium-graphene hybrid, or conducting polymer-selenium hybrid may be a mixture, blend, composite, or chemically or physically bonded entity of selenium or sulfide with a carbon, graphite, graphene, or conducting polymer material. For instance, a selenium-graphene hybrid can be a simple mixture (in a particle form) of selenium and graphene prepared by ball-milling. Such a hybrid can contain selenium bonded on surfaces of a graphene oxide sheet, etc. As another example, the selenium-carbon hybrid can be a simple mixture (in a particle form) of selenium and carbon nanotubes, or can contain selenium residing in pores of activated carbon particles.

In the invented rechargeable alkali metal-selenium cell, the high-elasticity polymer may contain a cross-linked network of polymer chains having an ether linkage, nitrile-derived linkage, benzo peroxide-derived linkage, ethylene oxide linkage, propylene oxide linkage, vinyl alcohol linkage, cyanoresin linkage, triacrylate monomer-derived linkage, tetraacrylate monomer-derived linkage, or a combination thereof in said cross-linked network of polymer chains.

In some preferred embodiments, the high-elasticity polymer contains a cross-linked network of polymer chains selected from nitrile-containing polyvinyl alcohol chains, cyanoresin chains, pentaerythritol tetraacrylate chains, pentaerythritol triacrylate chains, ethoxylated trimethylolpropane triacrylate (ETPTA) chains, ethylene glycol methyl ether acrylate (EGMEA) chains, or a combination thereof.

In the rechargeable alkali metal-selenium cell, the metal sulfide may contain a material denoted by $M_xSe_y$, wherein x is an integer from 1 to 3 and y is an integer from 1 to 10, and M is a metal element selected from an alkali metal, an alkaline metal selected from Mg or Ca, a transition metal, a metal from groups 13 to 17 of the periodic table, or a combination thereof. The metal element M preferably is selected from Li, Na, K, Mg, Zn, Cu, Ti, Ni, Co, Fe, or Al.

In some preferred embodiments, the metal sulfide in the cathode layer contains $Li_2Se_1$, $Li_2Se_2$, $Li_2Se_3$, $Li_2Se_4$, $Li_2Se_5$, $Li_2Se_6$, $Li_2Se_7$, $Li_2Se_8$, $Li_2Se_9$, $Li_2Se_{10}$, $Na_2Se_1$, $Na_2Se_2$, $Na_2Se_3$, $Na_2Se_4$, $Na_2Se_5$, $Na_2Se_6$, $Na_2Se_7$, $Na_2Se_8$, $Na_2Se_9$, $Na_2Se_{10}$, $K_2Se_1$, $K_2Se_2$, $K_2Se_3$, $K_2Se_4$, $K_2Se_5$, $K_2Se_6$, $K_2Se_7$, $K_2Se_8$, $K_2Se_9$, or $K_2Se_{10}$.

In the rechargeable alkali metal-selenium cell, the carbon or graphite material in the cathode active material layer may be selected from mesophase pitch, mesophase carbon, mesocarbon microbead (MCMB), coke particle, expanded graphite flake, artificial graphite particle, natural graphite particle, highly oriented pyrolytic graphite, soft carbon particle, hard carbon particle, carbon nanotube, carbon nanofiber, carbon fiber, graphite nanofiber, graphite fiber, carbonized polymer fiber, activated carbon, carbon black, or a combination thereof. The graphene may be selected from pristine graphene, graphene oxide, reduced graphene oxide (RGO), graphene fluoride, nitrogenated graphene, hydrogenated graphene, doped graphene, functionalized graphene, or a combination thereof.

The conducting polymer-selenium hybrid may preferably contain an intrinsically conductive polymer selected from polyaniline, polypyrrole, polythiophene, polyfuran, a bi-cyclic polymer, a sulfonated derivative thereof, or a combination thereof.

In certain embodiments, the high-elasticity polymer contains from 0.1% to 50% by weight of a lithium ion-conducting additive dispersed therein, or contains therein from 0.1% by weight to 10% by weight of a reinforcement nanofilament selected from carbon nanotube, carbon nanofiber, graphene, or a combination thereof.

In certain embodiments, the high-elasticity polymer is mixed with a lithium ion-conducting additive to form a composite wherein the lithium ion-conducting additive is dispersed in the high-elasticity polymer and is selected from $Li_2CO_3$, $Li_2O$, $Li_2C_2O_4$, LiOH, LiX, $ROCO_2Li$, HCOLi, ROLi, $(ROCO_2Li)_2$, $(CH_2OCO_2Li)_2$, $Li_2S$, $Li_xSO_y$, or a combination thereof, wherein X=F, Cl, I, or Br, R=a hydrocarbon group, $0<x\leq1$ and $1\leq y\leq4$.

In certain embodiments, the high-elasticity polymer is mixed with a lithium ion-conducting additive to form a composite wherein the lithium ion-conducting additive is dispersed in the high-elasticity polymer and is selected from lithium perchlorate ($LiClO_4$), lithium hexafluorophosphate ($LiPF_6$), lithium borofluoride ($LiBF_4$), lithium hexafluoroarsenide ($LiAsF_6$), lithium trifluoro-metasulfonate ($LiCF_3SO_3$), bis-trifluoromethyl sulfonylimide lithium ($LiN(CF_3SO_2)_2$), lithium bis(oxalato)borate (LiBOB), lithium oxalyldifluoroborate ($LiBF_2C_2O_4$), lithium oxalyldifluoroborate ($LiBF_2C_2O_4$), lithium nitrate ($LiNO_3$), Li-fluoroalkyl-phosphates, ($LiPF_3(CF_2CF_3)_3$), lithium bisperfluoroethysulfonylimide (LiBETI), lithium bis(trifluoromethanesulfonyl)imide, lithium bis(fluorosulfonyl)imide, lithium trifluoromethanesulfonimide, LiTFSI, an ionic liquid-based lithium salt, or a combination thereof.

In certain embodiments, the high-elasticity polymer is mixed with a sodium ion-conducting additive to form a composite. The sodium-conducting additive may be selected from, for example, $Na_2CO_3$, $Na_2O$, $Na_2C_2O_4$, NaOH, NaX, $ROCO_2Na$, HCONa, RONa, $(ROCO_2Na)_2$, $(CH_2OCO_2Na)_2$, $Na_2S$, $Na_xSO_y$, or a combination thereof, wherein X=F, Cl, I, or Br, R=a hydrocarbon group, $0<x\leq1$ and $1\leq y\leq4$.

The sodium-conducting additive also may be selected from sodium perchlorate, $NaClO_4$, sodium hexafluorophosphate ($NaPF_6$), sodium borofluoride ($NaBF_4$), sodium hexafluoroarsenide, ($NaAsF_6$), sodium trifluoro-metasulfonate ($NaCF_3SO_3$), bis-trifluoromethyl sulfonylimide sodium ($NaN(CF_3SO_2)_2$), sodium bis(oxalato)borate (NaBOB), sodium oxalyldifluoroborate ($NaBF_2C_2O_4$), sodium oxalyldifluoroborate ($NaBF_2C_2O_4$), sodium nitrate ($NaNO_3$), Na-fluoroalkyl-phosphates ($NaPF_3(CF_2CF_3)_3$), sodium bisperfluoro-ethysulfonylimide (NaBETI), sodium bis(trifluoromethanesulfonyl)imide, sodium bis(fluorosulfonyl)imide, sodium trifluoromethanesulfonimide (NaTFSI), an ionic liquid-based sodium salt, or a combination thereof.

In certain preferred embodiments, the high-elasticity polymer is mixed with an electron-conducting polymer selected from polyaniline, polypyrrole, polythiophene, polyfuran, a bi-cyclic polymer, a sulfonated derivative thereof, or a combination thereof.

In certain embodiments, the high-elasticity polymer forms a mixture or blend with a lithium ion-conducting polymer selected from poly(ethylene oxide) (PEO), polypropylene oxide (PPO), poly(acrylonitrile) (PAN), poly(methyl methacrylate) (PMMA), poly(vinylidene fluoride) (PVDF), poly bis-methoxy ethoxyethoxide-phosphazene, polyvinyl chloride, polydimethylsiloxane, poly(vinylidene fluoride)-hexafluoropropylene (PVDF-HFP), a sulfonated derivative thereof, or a combination thereof.

Typically, the high-elasticity polymer has a lithium ion conductivity or sodium ion conductivity from $1\times10^{-5}$ S/cm to $5\times10^{-2}$ S/cm at room temperature.

The rechargeable alkali metal-selenium cell has a selenium utilization efficiency from 80% to 99%, more typically from 85% to 97%.

In the rechargeable alkali metal-selenium cell, the electrolyte is selected from polymer electrolyte, polymer gel electrolyte, composite electrolyte, ionic liquid electrolyte, non-aqueous liquid electrolyte, soft matter phase electrolyte, solid-state electrolyte, or a combination thereof. The electrolyte may contain a salt selected from lithium perchlorate ($LiClO_4$), lithium hexafluorophosphate ($LiPF_6$), lithium borofluoride ($LiBF_4$), lithium hexafluoroarsenide ($LiAsF_6$), lithium trifluoro-metasulfonate ($LiCF_3SO_3$), bis-trifluoromethyl sulfonylimide lithium ($LiN(CF_3SO_2)_2$), lithium bis(oxalato)borate (LiBOB), lithium oxalyldifluoroborate ($LiBF_2C_2O_4$), lithium oxalyldifluoroborate ($LiBF_2C_2O_4$), lithium nitrate ($LiNO_3$), Li-fluoroalkyl-phosphates ($LiPF_3(CF_2CF_3)_3$), lithium bisperfluoroethysulfonylimide (LiBETI), an ionic liquid salt, sodium perchlorate ($NaClO_4$), potassium perchlorate ($KClO_4$), sodium hexafluorophosphate ($NaPF_6$), potassium hexafluorophosphate ($KPF_6$), sodium borofluoride ($NaBF_4$), potassium borofluoride ($KBF_4$), sodium hexafluoroarsenide, potassium hexafluoroarsenide, sodium trifluoro-metasulfonate ($NaCF_3SO_3$), potassium trifluoro-metasulfonate ($KCF_3SO_3$), bis-trifluoromethyl sulfonylimide sodium ($NaN(CF_3SO_2)_2$), sodium trifluoromethanesulfonimide (NaTFSI), bis-trifluoromethyl sulfonylimide potassium ($KN(CF_3SO_2)_2$), or a combination thereof.

The solvent may be selected from ethylene carbonate (EC), dimethyl carbonate (DMC), methylethyl carbonate (MEC), diethyl carbonate (DEC), ethyl propionate, methyl propionate, propylene carbonate (PC), γ-butyrolactone (γ-BL), acetonitrile (AN), ethyl acetate (EA), propyl formate (PF), methyl formate (MF), toluene, xylene or methyl acetate (MA), fluoroethylene carbonate (FEC), vinylene carbonate (VC), allyl ethyl carbonate (AEC), 1,3-dioxolane (DOL), 1,2-dimethoxyethane (DME), tetraethylene glycol dimethylether (TEGDME), Poly(ethylene glycol) dimethyl ether (PEGDME), diethylene glycol dibutyl ether (DEGDBE), 2-ethoxyethyl ether (EEE), sulfone, sulfolane, room temperature ionic liquid, or a combination thereof.

In certain embodiments, the anode active material layer contains an anode active material selected from lithium metal, sodium metal, potassium metal, a lithium metal alloy, sodium metal alloy, potassium metal alloy, a lithium intercalation compound, a sodium intercalation compound, a potassium intercalation compound, a lithiated compound, a sodiated compound, a potassium-doped compound, lithiated titanium dioxide, lithium titanate, lithium manganate, a lithium transition metal oxide, $Li_4Ti_5O_{12}$, or a combination thereof.

The rechargeable alkali metal-selenium cell may be a lithium ion-selenium cell and, in this case, the anode active material layer contains an anode active material selected from the group consisting of: (a) silicon (Si), germanium (Ge), tin (Sn), lead (Pb), antimony (Sb), bismuth (Bi), zinc (Zn), aluminum (Al), nickel (Ni), cobalt (Co), manganese (Mn), titanium (Ti), iron (Fe), and cadmium (Cd), and lithiated versions thereof; (b) alloys or intermetallic compounds of Si, Ge, Sn, Pb, Sb, Bi, Zn, Al, or Cd with other elements, and lithiated versions thereof, wherein said alloys or compounds are stoichiometric or non-stoichiometric; (c) oxides, carbides, nitrides, sulfides, phosphides, selenides, and tellurides of Si, Ge, Sn, Pb, Sb, Bi, Zn, Al, Fe, Ni, Co, Ti, Mn, or Cd, and their mixtures or composites, and lithiated versions thereof; (d) salts and hydroxides of Sn and lithiated versions thereof; (e) carbon or graphite materials and prelithiated versions thereof and combinations thereof.

The rechargeable alkali metal-selenium cell may be a sodium ion-selenium cell or potassium ion-selenium cell and, in this case, the anode active material layer contains an anode active material selected from the group consisting of: (a) Sodium- or potassium-doped silicon (Si), germanium (Ge), tin (Sn), lead (Pb), antimony (Sb), bismuth (Bi), zinc (Zn), aluminum (Al), titanium (Ti), cobalt (Co), nickel (Ni), manganese (Mn), cadmium (Cd), and mixtures thereof; (b) Sodium- or potassium-containing alloys or intermetallic compounds of Si, Ge, Sn, Pb, Sb, Bi, Zn, Al, Ti, Co, Ni, Mn, Cd, and their mixtures; (c) Sodium- or potassium-containing oxides, carbides, nitrides, sulfides, phosphides, selenides, tellurides, or antimonides of Si, Ge, Sn, Pb, Sb, Bi, Zn, Al, Fe, Ti, Co, Ni, Mn, Cd, and mixtures or composites thereof; (d) Sodium or potassium salts; (e) particles of graphite, hard carbon, soft carbon or carbon particles and pre-sodiated versions thereof and combinations thereof.

Preferably, in the rechargeable alkali metal-selenium cell, the particulates contain from 80% to 99% by weight of selenium, metal selenide, or metal compound based on the total weight of the high-capacity polymer and the selenium, metal selenide, or metal compound combined.

The present invention also provides a cathode active material layer for a rechargeable alkali metal-selenium cell. This cathode active material layer contains multiple particulates of a selenium-containing material selected from a selenium-carbon hybrid, selenium-graphite hybrid, selenium-graphene hybrid, conducting polymer-selenium hybrid, a metal selenide, a Se alloy or mixture with Sn, Sb, Bi, S, or Te, a selenium compound, or a combination thereof and wherein at least one of said particulates is composed of one or a plurality of selenium-containing material particles being embraced or encapsulated by a thin layer of a high-elasticity polymer having a recoverable tensile strain no less than 10% when measured without an additive or reinforcement, a lithium ion conductivity no less than $10^{-7}$ S/cm at room temperature (typically up to $5 \times 10^{-2}$ S/cm), and a thickness from 0.5 nm to 10 μm (preferably and typically from 1 nm to 1 μm, more preferably <100 nm).

In this product (a cathode layer), the selenium-carbon hybrid, selenium-graphite hybrid, selenium-graphene hybrid, or conducting polymer-selenium hybrid is a mixture, blend, composite, chemically or physically bonded entity of selenium or selenide with a carbon, graphite, graphene, or conducting polymer material.

In this cathode active material layer product, the high-elasticity polymer preferably contains a cross-linked network of polymer chains having an ether linkage, nitrile-derived linkage, benzo peroxide-derived linkage, ethylene oxide linkage, propylene oxide linkage, vinyl alcohol linkage, cyanoresin linkage, triacrylate monomer-derived linkage, tetraacrylate monomer-derived linkage, or a combination thereof in the cross-linked network of polymer chains. Preferably, the high-elasticity polymer contains a cross-linked network of polymer chains selected from nitrile-containing polyvinyl alcohol chains, cyanoresin chains, pentaerythritol tetraacrylate chains, pentaerythritol triacrylate chains, ethoxylated trimethylolpropane triacrylate (ETPTA) chains, ethylene glycol methyl ether acrylate (EGMEA) chains, or a combination thereof.

In the cathode active material layer, the metal selenide may contain $M_xSe_y$, wherein x is an integer from 1 to 3 and y is an integer from 1 to 10, and M is a metal element selected from an alkali metal, an alkaline metal selected from Mg or Ca, a transition metal, a metal from groups 13 to 17 of the periodic table, or a combination thereof.

The carbon or graphite material in the cathode active material layer may be selected from mesophase pitch, mesophase carbon, mesocarbon microbead (MCMB), coke particle, expanded graphite flake, artificial graphite particle, natural graphite particle, highly oriented pyrolytic graphite, soft carbon particle, hard carbon particle, carbon nanotube, carbon nanofiber, carbon fiber, graphite nanofiber, graphite fiber, carbonized polymer fiber, activated carbon, carbon black, or a combination thereof.

This cathode active material layer further comprises a binder resin that bonds the multiple particulates (of encapsulated selenium-containing particles) together to form the cathode active material layer, wherein the binder resin is not part of the multiple particulates (i.e. not included inside the core portion of a particulate) and is external to the multiple particulates. In other words, the high-elasticity polymer does not embrace the binder resin.

In the alternative, the present invention also provides a cathode active material layer for a rechargeable alkali metal-selenium cell, wherein the cathode active material layer contains a resin binder, an optional conductive additive, and multiple particles of a selenium-containing material selected from a selenium-carbon hybrid, selenium-graphite hybrid, selenium-graphene hybrid, conducting polymer-selenium hybrid, a metal selenide, a Se alloy or mixture with Sn, Sb, Bi, S, or Te, a selenium compound, or a combination thereof, wherein the selenium-containing material particles are bonded by the resin binder to form an integral solid layer (a layer of adequate structural integrity so that it can be freely-standing), and wherein the integral solid layer is covered and protected by a thin layer of a high-elasticity polymer having a recoverable tensile strain no less than 5% when measured without an additive or reinforcement, a lithium ion conductivity no less than $10^{-5}$ S/cm at room temperature, and a thickness from 0.5 nm to 10 μm. In some embodiments, the integral solid layer is bonded by the resin binder to a cathode current collector.

Such a high-elasticity polymer protective layer can be formed by spraying the precursor mass (monomer or oligomer with the required initiator or curing agent) over a pre-made cathode active material layer and then polymerized and cross-linked.

The invention also provides a rechargeable alkali metal-selenium cell that contains such a cathode active material layer protected by a high-elasticity polymer. This alkali metal-selenium cell comprises: (a) an anode active material layer and an optional anode current collector supporting the anode active material layer; (b) a cathode that contains this cathode active material layer; and (c) an electrolyte with an optional porous separator layer in ionic contact with the anode active material layer and the cathode active material layer.

The present invention also provides a powder mass product for use in a lithium-selenium battery cathode. The powder mass comprises multiple particulates of a selenium-containing material selected from a selenium-carbon hybrid, selenium-graphite hybrid, selenium-graphene hybrid, conducting polymer-selenium hybrid, a metal selenide, a Se alloy or mixture with Sn, Sb, Bi, S, or Te, a selenium compound, or a combination thereof and wherein at least one of the particulates comprises one or a plurality of selenium-containing material particles being embraced or encapsulated by a thin layer of a high-elasticity polymer having a recoverable tensile strain no less than 5% when measured without an additive or reinforcement, a lithium ion conductivity no less than $10^{-7}$ S/cm at room temperature, and a thickness from 0.5 nm to 10 μm.

In the powder mass, the selenium-carbon hybrid, selenium-graphite hybrid, selenium-graphene hybrid, or conducting polymer-selenium hybrid is a mixture, blend, composite, chemically or physically bonded entity of selenium or selenide with a carbon, graphite, graphene, or conducting polymer material. The high-elasticity polymer contains a cross-linked network of polymer chains having an ether linkage, nitrile-derived linkage, benzo peroxide-derived linkage, ethylene oxide linkage, propylene oxide linkage, vinyl alcohol linkage, cyanoresin linkage, triacrylate monomer-derived linkage, tetraacrylate monomer-derived linkage, or a combination thereof in said cross-linked network of polymer chains. Preferably, the high-elasticity polymer contains a cross-linked network of polymer chains selected from nitrile-containing polyvinyl alcohol chains, cyanoresin chains, pentaerythritol tetraacrylate chains, pentaerythritol triacrylate chains, ethoxylated trimethylolpropane triacrylate (ETPTA) chains, ethylene glycol methyl ether acrylate (EGMEA) chains, or a combination thereof.

In the powder mass, the metal selenide preferably contains $M_xSe_y$, wherein x is an integer from 1 to 3 and y is an integer from 1 to 10, and M is a metal element selected from an alkali metal, an alkaline metal selected from Mg or Ca, a transition metal, a metal from groups 13 to 17 of the periodic table, or a combination thereof.

The present invention also provides a method of manufacturing a rechargeable alkali metal-selenium cell. The method comprises: (a) Providing a cathode and an optional cathode current collector to support the cathode; (b) Providing an alkali metal anode, selected from Li, Na, K, or a combination thereof and an optional anode current collector to support the anode; (c) combining the anode and the cathode and adding an electrolyte in contact with the anode and the cathode to form the alkali metal-selenium cell; wherein the cathode contains multiple particulates of a selenium-containing material wherein at least one of the particulates is composed of one or a plurality of selenium-containing material particles which are embraced or encapsulated by a thin layer of a high-elasticity polymer having a recoverable tensile strain from 5% to 700% when measured without an additive or reinforcement (more typically from 10% to 300%), a lithium ion conductivity no less than $10^{-7}$ S/cm (typically from $1\times10^{-5}$ S/cm to $5\times10^{-2}$ S/cm) at room temperature, and a thickness from 0.5 nm to 10 μm (preferably from 1 nm to 1 more preferably from 1 nm to 100 nm, and most preferably, from 1 nm to 10 nm). A separator may be added to electrically separate the anode and the cathode if the electrolyte is not a solid electrolyte.

In the above manufacturing method, the selenium-containing material preferably is selected from a selenium-carbon hybrid, selenium-graphite hybrid, selenium-graphene hybrid, conducting polymer-selenium hybrid, a metal selenide, a Se alloy or mixture with Sn, Sb, Bi, S, or Te, a selenium compound, or a combination thereof. The selenium-carbon hybrid, selenium-graphite hybrid, selenium-graphene hybrid, or conducting polymer-selenium hybrid is a mixture, blend, composite, chemically or physically bonded entity of selenium or selenide with a carbon, graphite, graphene, or conducting polymer material In the invented manufacturing method, the high-elasticity polymer preferably contains a cross-linked network of polymer chains having an ether linkage, nitrile-derived linkage, benzo peroxide-derived linkage, ethylene oxide linkage, propylene oxide linkage, vinyl alcohol linkage, cyanoresin linkage, triacrylate monomer-derived linkage, tetraacrylate monomer-derived linkage, or a combination thereof in said cross-linked network of polymer chains. Preferably, the high-elasticity polymer contains a cross-linked network of polymer chains selected from nitrile-containing polyvinyl alcohol chains, cyanoresin chains, pentaerythritol tetraacrylate chains, pentaerythritol triacrylate chains, ethoxylated trimethylolpropane triacrylate (ETPTA) chains, ethylene glycol methyl ether acrylate (EGMEA) chains, or a combination thereof.

In the manufacturing method, the operation of providing multiple particulates may include encapsulating or embracing the one or a plurality of selenium-containing material particles with said thin layer of high-elasticity polymer using a procedure selected from pan coating, air suspension, centrifugal extrusion, vibrational nozzle, spray-drying, ultrasonic spraying, coacervation-phase separation, interfacial polycondensation, in-situ polymerization, matrix polymerization, or a combination thereof.

In some embodiments, the operation of providing multiple particulates includes encapsulating or embracing said one or a plurality of selenium-containing material particles with a mixture of said high-elasticity polymer with an elastomer, an electronically conductive polymer, a lithium-ion conducting material, a sodium ion conducting additive, a reinforcement material, or a combination thereof. Preferably, the lithium ion-conducting material is dispersed in said high-elasticity polymer and is selected from $Li_2CO_3$, $Li_2O$, $Li_2C_2O_4$, LiOH, LiX, $ROCO_2Li$, $HCOLi$, ROLi, $(ROCO_2Li)_2$, $(CH_2OCO_2Li)_2$, $Li_2S$, $Li_xSO_y$, or a combination thereof, wherein X=F, Cl, I, or Br, R=a hydrocarbon group, $0<x\leq1$ and $1\leq y\leq4$.

In certain embodiments, the lithium ion-conducting material is dispersed in said high-elasticity polymer and is selected from lithium perchlorate ($LiClO_4$), lithium hexafluorophosphate ($LiPF_6$), lithium borofluoride ($LiBF_4$), lithium hexafluoroarsenide ($LiAsF_6$), lithium trifluoro-metasulfonate ($LiCF_3SO_3$), bis-trifluoromethyl sulfonylimide lithium ($LiN(CF_3SO_2)_2$), lithium bis(oxalato)borate (LiBOB), lithium oxalyldifluoroborate ($LiBF_2C_2O_4$), lithium oxalyldifluoroborate ($LiBF_2C_2O_4$), lithium nitrate ($LiNO_3$), Li-fluoroalkyl-phosphates, ($LiPF_3(CF_2CF_3)_3$), lithium bisperfluoro-ethysulfonylimide (LiBETI), lithium bis(trifluoromethanesulfonyl)imide, lithium bis(fluorosulfonyl)imide, lithium trifluoromethanesulfonimide, LiTFSI, an ionic liquid-based lithium salt, or a combination thereof.

In the instant Li—Se cell, the reversible specific capacity of the selenium cathode is typically and preferably no less than 500 mAh per gram and often exceeds 600 or even 625 mAh per gram of entire cathode layer. The high specific capacity of the presently invented cathode, when combined with a lithium anode, typically leads to a cell specific energy significantly greater than 350 Wh/kg, based on the total cell weight including anode, cathode, electrolyte, separator, and current collector weights combined. This specific energy value is not based on the cathode active material weight or cathode layer weight only (as sometimes did in open literature or patent applications); instead, this is based on entire cell weight. In many cases, the cell specific energy is higher than 400 Wh/kg and, in some examples, exceeds 450 Wh/kg.

DETAILED DESCRIPTION OF PREFERRED EMBODIMENTS

Figure 1A:
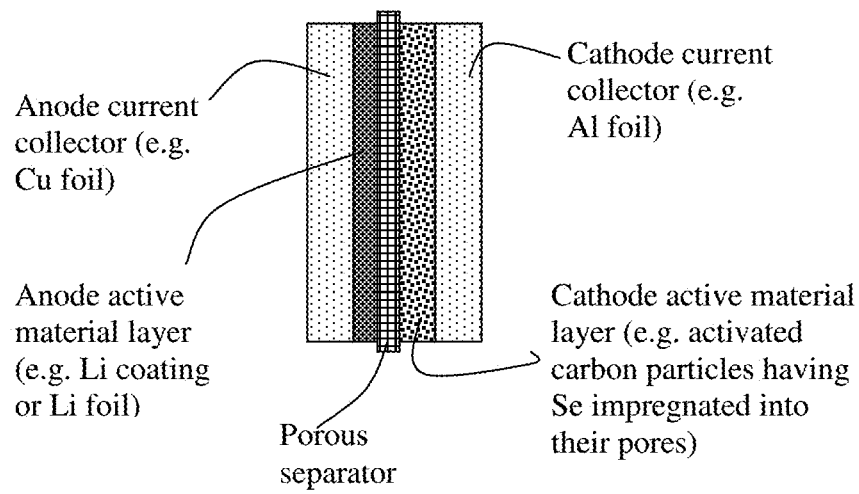
FIG. 1(A) Schematic of a prior art lithium or sodium metal-selenium battery cell, wherein the anode layer is a thin coating or foil of an anode active material (Li or Na metal) and the cathode is composed of particles of a cathode active material, a conductive additive (not shown) and a resin binder (not shown).
Figure 1B:
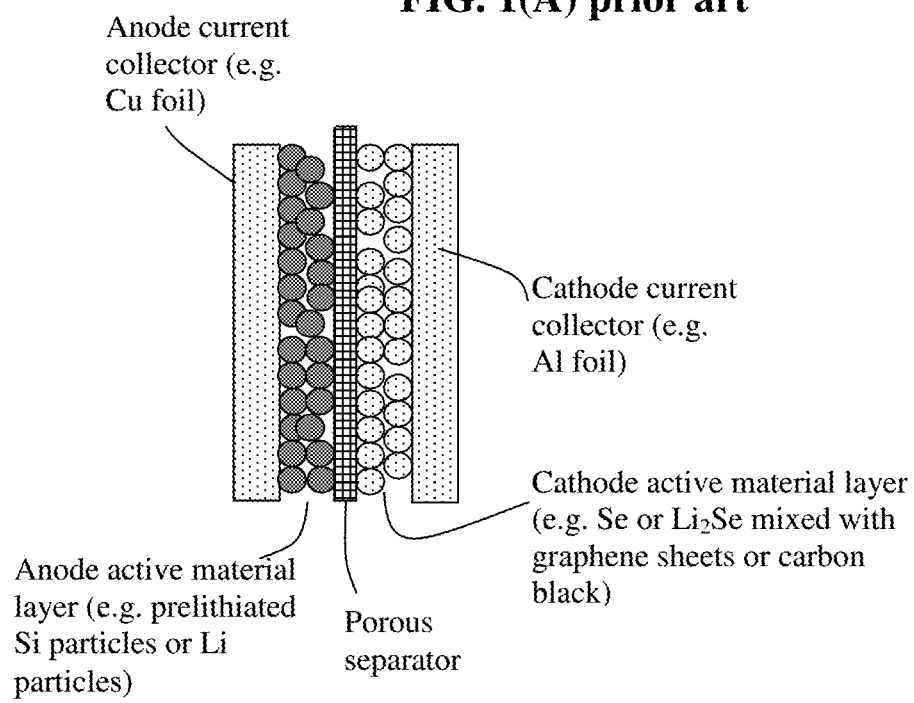
FIG. 1(B) Schematic of a prior art lithium-ion selenium battery; the anode layer being composed of particles of an anode active material (e.g. fully lithiated Si particles), a conductive additive (not shown) and a resin binder (not shown).

For convenience, the following discussion of preferred embodiments is primarily based on Li—Se cells, but the same or similar composition, structure, and methods are applicable to Na—Se and K—Se cells. Examples are presented for Li—Se cells, Na—Se cells, and K—Se cells.

A. Alkali Metal-Selenium Cells (Using Lithium-Selenium Cells as an Example)

The specific capacity and specific energy of a Li—Se cell (or Na—Se, or K—Se cell) are dictated by the actual amount of selenium that can be implemented in the cathode active layer (relative to other non-active ingredients, such as the binder resin and conductive filler) and the utilization rate of this selenium amount (i.e. the utilization efficiency of the cathode active material or the actual proportion of Se that actively participates in storing and releasing lithium ions). Using Li—Se cell as an illustrative example, a high-capacity and high-energy Li—Se cell requires a high amount of Se in the cathode active layer (i.e. relative to the amounts of non-active materials, such as the binder resin, conductive additive, and other modifying or supporting materials) and a high Se utilization efficiency). The present invention provides such a cathode active layer, its constituent powder mass product, the resulting Li—Se cell, and a method of producing such a cathode active layer and battery.

The alkali metal-selenium cell comprises (a) an anode active material layer and an optional anode current collector supporting the anode active material layer; (b) a cathode active material layer and an optional cathode current collector supporting the cathode active material layer; and (c) an electrolyte with an optional porous separator layer in ionic contact with the anode active material layer and the cathode active material layer; wherein the cathode active material layer contains multiple particulates of a selenium-containing material selected from a selenium-carbon hybrid, selenium-graphite hybrid, selenium-graphene hybrid, conducting polymer-selenium hybrid, a metal selenide, a Se alloy or mixture with Sn, Sb, Bi, S, or Te, a selenium compound, or a combination thereof and wherein at least one of the particulates is composed of one or a plurality of the selenium-containing material particles being embraced or encapsulated by a thin layer of a high-elasticity polymer having a recoverable tensile strain no less than 10% when measured without an additive or reinforcement, a lithium ion conductivity or sodium ion conductivity no less than $10^{-7}$ S/cm (typically from $10^{-5}$ S/cm to $5 \times 10^{-2}$ S/cm, measured at room temperature), and a thickness from 0.5 nm to 10 μm (typically from 1 nm to 1 μm, but preferably <100 nm and more preferably <10 nm).

The selenium-carbon hybrid, selenium-graphite hybrid, selenium-graphene hybrid, or conducting polymer-selenium hybrid may be a mixture, blend, composite, or chemically or physically bonded entity of selenium or selenide with a carbon, graphite, graphene, or conducting polymer material. For instance, a selenium-graphene hybrid can be a simple mixture (in a particle form) of selenium and graphene prepared by ball-milling. Such a hybrid can contain selenium bonded on surfaces of a graphene oxide sheet, etc. As another example, the selenium-carbon hybrid can be a simple mixture (in a particle form) of selenium and carbon nanotubes, or can contain selenium residing in pores of activated carbon particles.

In the invented rechargeable alkali metal-selenium cell, the high-elasticity polymer may contain a cross-linked network of polymer chains having an ether linkage, nitrile-derived linkage, benzo peroxide-derived linkage, ethylene oxide linkage, propylene oxide linkage, vinyl alcohol linkage, cyanoresin linkage, triacrylate monomer-derived linkage, tetraacrylate monomer-derived linkage, or a combination thereof in said cross-linked network of polymer chains. In some preferred embodiments, the high-elasticity polymer contains a cross-linked network of polymer chains selected from nitrile-containing polyvinyl alcohol chains, cyanoresin chains, pentaerythritol tetraacrylate chains, pentaerythritol triacrylate chains, ethoxylated trimethylolpropane triacrylate (ETPTA) chains, ethylene glycol methyl ether acrylate (EGMEA) chains, or a combination thereof.

In the rechargeable alkali metal-selenium cell, the metal selenide may contain a material denoted by $M_xSe_y$, wherein x is an integer from 1 to 3 and y is an integer from 1 to 10, and M is a metal element selected from an alkali metal, an alkaline metal selected from Mg or Ca, a transition metal, a metal from groups 13 to 17 of the periodic table, or a combination thereof. The metal element M preferably is selected from Li, Na, K, Mg, Zn, Cu, Ti, Ni, Co, Fe, or Al. In some preferred embodiments, the metal selenide in the cathode layer contains $Li_2Se_1$, $Li_2Se_2$, $Li_2Se_3$, $Li_2Se_4$, $Li_2Se_5$, $Li_2Se_6$, $Li_2Se_7$, $Li_2Se_8$, $Li_2Se_9$, $Li_2Se_{10}$, $Na_2Se_1$, $Na_2Se_2$, $Na_2Se_3$, $Na_2Se_4$, $Na_2Se_5$, $Na_2Se_6$, $Na_2Se_7$, $Na_2Se_8$, $Na_2Se_9$, $Na_2Se_{10}$, $K_2Se_1$, $K_2Se_2$, $K_2Se_3$, $K_2Se_4$, $K_2Se_5$, $K_2Se_6$, $K_2Se_7$, $K_2Se_8$, $K_2Se_9$, or $K_2Se_{10}$.

In the rechargeable alkali metal-selenium cell, the carbon or graphite material in the cathode active material layer may be selected from mesophase pitch, mesophase carbon, mesocarbon microbead (MCMB), coke particle, expanded graphite flake, artificial graphite particle, natural graphite particle, highly oriented pyrolytic graphite, soft carbon particle, hard carbon particle, carbon nanotube, carbon nanofiber, carbon fiber, graphite nanofiber, graphite fiber, carbonized polymer fiber, activated carbon, carbon black, or a combination thereof. The graphene may be selected from pristine graphene, graphene oxide, reduced graphene oxide (RGO), graphene fluoride, nitrogenated graphene, hydrogenated graphene, doped graphene, functionalized graphene, or a combination thereof.

The conducting polymer-selenium hybrid may preferably contain an intrinsically conductive polymer selected from polyaniline, polypyrrole, polythiophene, polyfuran, a bi-cyclic polymer, a sulfonated derivative thereof, or a combination thereof. This can be a simple mixture of selenium or metal selenide with a conducting polymer.

In certain embodiments, the high-elasticity polymer contains from 0.1% to 50% by weight of a lithium ion-conducting additive dispersed therein, or contains therein from 0.1% by weight to 10% by weight of a reinforcement nanofilament selected from carbon nanotube, carbon nanofiber, graphene, or a combination thereof. The lithium ion-conducting additive to form a composite wherein said lithium ion-conducting additive is dispersed in said high-elasticity polymer and is selected from $Li_2CO_3$, $Li_2O$, $Li_2C_2O_4$, LiOH, LiX, $ROCO_2Li$, HCOLi, ROLi, $(ROCO_2Li)_2$, $(CH_2OCO_2Li)_2$, $Li_2S$, $Li_xSO_y$, or a combination thereof, wherein X=F, Cl, I, or Br, R=a hydrocarbon group, $0<x\le1$ and $1\le y\le4$.

The lithium, sodium, or potassium ion-conducting additive may be dispersed in the high-elasticity polymer and may be selected from lithium perchlorate ($LiClO_4$), lithium hexafluorophosphate ($LiPF_6$), lithium borofluoride ($LiBF_4$), lithium hexafluoroarsenide ($LiAsF_6$), lithium trifluoro-metasulfonate ($LiCF_3SO_3$), bis-trifluoromethyl sulfonylimide lithium ($LiN(CF_3SO_2)_2$), lithium bis(oxalato)borate (LiBOB), lithium oxalyldifluoroborate ($LiBF_2C_2O_4$), lithium oxalyldifluoroborate ($LiBF_2C_2O_4$), lithium nitrate ($LiNO_3$), Li-fluoroalkyl-phosphate ($LiPF_3(CF_2CF_3)_3$), lithium bisperfluoroethysulfonylimide (LiBETI), an ionic liquid salt, sodium perchlorate ($NaClO_4$), potassium perchlorate ($KClO_4$), sodium hexafluorophosphate ($NaPF_6$), potassium hexafluorophosphate ($KPF_6$), sodium borofluoride ($NaBF_4$), potassium borofluoride ($KBF_4$), sodium hexafluoroarsenide, potassium hexafluoroarsenide, sodium trifluoro-metasulfonate ($NaCF_3SO_3$), potassium trifluoro-metasulfonate ($KCF_3SO_3$), bis-trifluoromethyl sulfonylimide sodium ($NaN(CF_3SO_2)_2$), sodium trifluoromethanesulfonimide (NaTFSI), bis-trifluoromethyl sulfonylimide potassium ($KN(CF_3SO_2)_2$), or a combination thereof.

High-elasticity polymer refers to a polymer, typically a lightly cross-linked polymer, which exhibits an elastic deformation that is at least 5% when measured (without an additive or reinforcement in the polymer) under uniaxial tension. In the field of materials science and engineering, the "elastic deformation" is defined as a deformation of a material (when being mechanically stressed) that is essentially fully recoverable and the recovery is essentially instantaneous upon release of the load. The elastic deformation is preferably greater than 10%, more preferably greater than 50%, further more preferably greater than 100%, still more preferably greater than 150%, and most preferably greater than 200%. The preferred types of high-capacity polymers will be discussed later.

Figure 4:
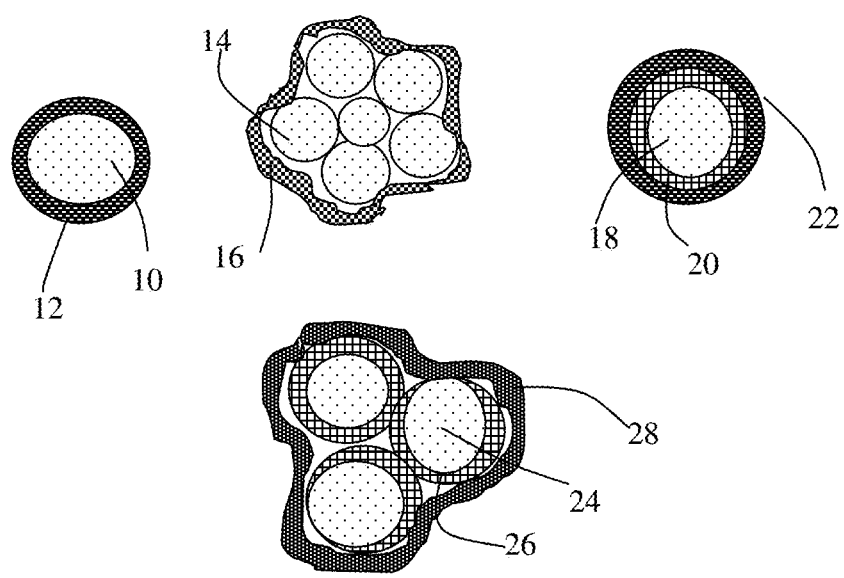
FIG. 4 Several different types of particulates containing high-elasticity polymer-encapsulated cathode active material particles (e.g. Se, lithium polyselenide, sodium polyselenide, potassium polyselenide, a Se alloy or mixture with Sn, Sb, Bi, S, or Te, or a combination thereof).

As illustrated in FIG. 4, the present invention provides four major types of particulates of high-capacity polymer-encapsulated cathode active material particles. The first one is a single-particle particulate containing a cathode active material core 10 (e.g. particle of a selenium-CNT mixture) encapsulated by a high-capacity polymer shell 12. The second is a multiple-particle particulate containing multiple cathode active material particles 14 (e.g. particles of selenium-graphene mixture, selenium-carbon black mixture, activated carbon particles having pores impregnated with S, lithium polyselenide particles, etc.), optionally along with other active materials (e.g. particles of graphite or hard carbon, not shown) or conductive additive, which are encapsulated by a high-capacity polymer 16. The third is a single-particle particulate containing a cathode active material core 18 coated by a carbon or graphene layer 20 (or other conductive material) and further encapsulated by a high-elasticity polymer 22. The fourth is a multiple-particle particulate containing multiple cathode active material particles 24 coated with a conductive protection layer 26 (carbon, graphene, etc.), optionally along with other active materials (e.g. particles of graphite or hard carbon, not shown) or conductive additive, which are encapsulated by a high-elasticity polymer shell 28. These cathode active material particles can be based on selenium compound, metal polyselenide, etc., instead of neat selenium.

Figure 3:
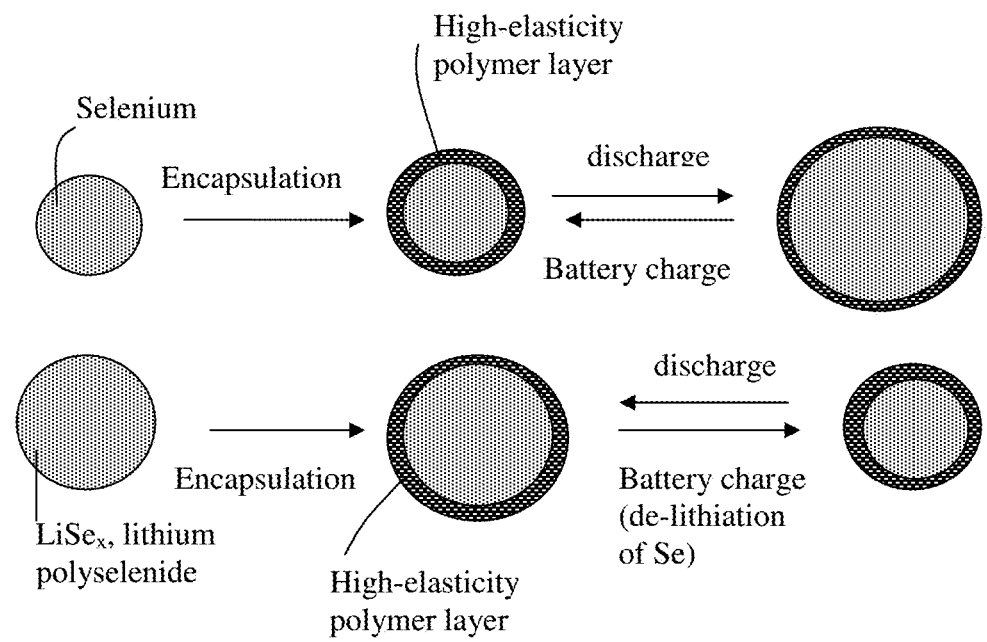
FIG. 3 Schematic of the presently invented high-elasticity polymer-encapsulated cathode active material particles (e.g. Se or $Li_2Se$ particles). The high elasticity of the polymer shell enables the shell to expand and contract congruently and conformingly with the core particle.

As schematically illustrated in the upper portion of FIG. 3, a selenium-based particle can be encapsulated by a high-capacity polymer shell to form a core-shell structure (selenium core and polymer shell in this example). As the lithium-selenium battery is discharged, the cathode active material (e.g. selenium in the high-capacity polymer-encapsulated Se/CNT particle) reacts with lithium ions to form lithium polyselenide which expands in volume. Due to the high elasticity of the encapsulating shell (the high-capacity polymer), the shell will not be broken into segments (in contrast to the broken carbon shell). The high-capacity polymer shell remains intact, preventing the exposure of the underlying lithium selenide to electrolyte and, thus, preventing the lithium selenide from dissolving in the electrolyte during repeated charges/discharges of the battery. This strategy prevents continued migration of lithium polyselenide to the anode side which reacts with lithium and is unable to return to the cathode (the shuttle effect). This shuttle effect is mainly responsible for continued capacity decay in a conventional Li—Se, Na—Se, or K—Se cell.

Alternatively, referring to the lower portion of FIG. 3, lithium selenide is used as the cathode active material. A layer of high-capacity polymer may be encapsulated around the lithium polyselenide particle to form a core-shell structure. When the Li—Se battery is charged and lithium ions are released from the cathode, the cathode active material particle contracts. However, the high-capacity polymer is capable of elastically shrinking in a conformal manner; hence, leaving behind no gap between the protective shell and the selenium. Such a configuration is amenable to subsequent lithium reaction with selenium. The high-capacity polymer shell expands and shrinks congruently with the expansion and shrinkage of the encapsulated core cathode active material particle, enabling long-term cycling stability of a lithium battery.

Production of Se particles, from nanometer to micron scales, is well known in the art and fine Se powders are commercially available. Micron-scaled Se particles are easily produced using ball-milling if the initial powder size is too big. Due to the low melting point (221° C.) of Se, one can easily obtain Se melt and use a melt atomization technique to produce submicron Se particles, for instance. Various methods have been used in the past for synthesizing Se nanoparticle (SeNP), such as chemical reduction method, biological synthesis, solvothermal route, hydrothermal route, microwave assisted synthesis, green synthesis, electrodeposition method, and pulsed laser ablation method. The following references may be consulted for the details of several methods of producing SeNP:

1. Sheng-Yi Zhang, Juan Zhang, Hong-Yan Wang, Hong-Yuan Chen, "Synthesis of selenium nanoparticles in the presence of polysaccharides," Materials Letters, Volume 58, Issue 21, August 2004, Pages 2590-2594
2. Urarika Luesakul, Seamkwan Komenek, Songchan Puthong, Nongnuj Muangsin, "Shape-controlled synthesis of cubic-like selenium nanoparticles via the self-assembly method," Carbohydrate Polymers, Volume 153, 20 Nov. 2016, Pages 435-444.
3. C. Dwivedi, et al., "An Organic Acid-Induced Synthesis and Characterization of Selenium Nanoparticles," Journal of Nanotechnology, 2011: 1-6.
4. Lin, Z., Lin, F. and Wang, C. R. C. "Observation in the Growth of Selenium Nanoparticles," *Journal of Chinese Chemical Society*, 2004, 51 (2): 239-242.
5. Gao, B. X., Zhang, J. and Zhang, L., "Hollow Sphere Selenium Nanoparticles: Their In-Vitro Anti Hydroxyl Radical Effect," *Advanced Materials*, 14 (4), (2002) 290-293.
6. Li, Z. and Hua, P. 2009. "Mixed Surfactant Template Method for Preparation of Nanometer Selenium," *E-Journal of Chemistry* 6 (1) (2009) 304-310.
7. Chen, H., Shin, D., Nam, J., Kwon, K. and Yoo, J. 2010. "Selenium Nanowires and Nanotubes Synthesized via a Facile Template-Free Solution Method," *Materials Research Bulletin* 45 (6) (2010) 699-704.)
8. Zeng, K., Chen, S., Song, Y., Li, H., Li, F. and Liu, P. 2013, "Solvothermal Synthesis of Trigonal Selenium with Butterfly-like Microstructure," *Particuology*, 11 (5) (2013) 614-617.)
9. An, C. and Wang, S. 2007. "Diameter-Selected Synthesis of Single Crystalline Trigonal Selenium Nanowires.|*Materials Chemistry and Physics*, 2007, 101 (2-3): 357-361.
10. An, C., Tang, K., Liu, X. and Qian, Y., "Large-Scale Synthesis of High Quality Trigonal Selenium Nanowires.|*European Journal of Inorganic Chemistry*," 2003 (17): 3250-3255.

For instance, the chemical reduction method employs reduction of selenium salt using variety of reducing agents such as surfactants and biocompatible chemicals to obtain stabilized colloidal suspensions of nanoparticles. Various shapes and sizes of SeNP are synthesized using these methods. Chemical reduction method assists in maintaining better uniformity of the particles.

Dwivedi et al. [Ref. 3] used carboxylic acids like acetic acid, oxalic acid and aromatic acid (gallic acid) to synthesize SeNP of spherical shape and size 40-100 nm using sodium selenosulfate as the source of selenium. Lin et al. [Ref. 4] used sulfur dioxide and SDS as reducing agents and selenous acid was used as a precursor to synthesize SeNP with a size range of 30-200 nm. Gao et al. [Ref. 5] used β-mercaptoethanol as a reducing agent producing hollow sphere SeNP (HSSN) of size 32 nm.

A mixed surfactant synthesis carried out by Li and Hua [Ref. 6] showed the use of dihydroascorbic acid with sodium dodecyl sulfate and polyvinyl chloride to prepare SeNP of size 30 nm. A study reported by Chen et al. [Ref. 7] used template free solution to prepare trigonal Nanowires and Nanotubes of 70-100 nm width and 180-350 nm respectively wherein, glucose was selected as a reducing agent and sodium selenite as the selenium source forming α-Se. Recrystallization of these SeNP without template or a surfactant resulted in the transformation of α-Se to t-Se.

The solvothermal or hydrothermal method employs usage of a solvent under high pressure and temperature that involves the interaction of precursors during synthesis. For instance, Zeng et al. [Ref 8] synthesized nanoparticles using this method wherein, selenium was dissolved in ethylenediamine and kept in a Teflon coated autoclave maintaining the temperature at 160° C. for 2 hour and then cooled to RT to form a brown homogenous solution and then acetone stored at −18° C. was added to this solution to make it amorphous SeNP and further transforming it into trigonal selenium of hexagonal rod shaped structure. These particles on aging acquired a butterfly-like microstructure having 4 μm in width and 8 μm in length.

A study conducted by An & Wang [Ref 9 and 10] showed synthesis of trigonal selenium Nanowires of 10-60 nm in size using sodium selenite and thiosulfate salts as starting materials. Steam under pressure was used for the synthesis with a set temperature of 180° C.

Once the particles of Se are produced, they can be incorporated into a polymer-liquid medium suspension to make a polymer mixture suspension, dispersion or slurry. This suspension, dispersion, or slurry is then subjected to secondary particle formation treatment, such as spray-drying, spray-pyrolysis, ultrasonic spraying, and vibration-nozzle droplet formation, to make the invented polymer-protected particulates.

B. High-Elasticity Polymers

Preferably and typically, the high-capacity polymer has a lithium ion conductivity no less than $10^{-7}$ S/cm, more preferably no less than $10^{-4}$ S/cm, further preferably no less than $10^{-3}$ S/cm, and most preferably no less than $10^{-2}$ S/cm. In some embodiments, the high-capacity polymer is a neat polymer having no additive or filler dispersed therein. In others, the high-capacity polymer is a polymer matrix composite containing from 0.1% to 50% (preferably 1% to 35%) by weight of a lithium ion-conducting additive dispersed in a high-capacity polymer matrix material. The high-capacity polymer must have a high elasticity (elastic deformation strain value >5%). An elastic deformation is a deformation that is fully recoverable and the recovery process is essentially instantaneous (no significant time delay). The high-capacity polymer can exhibit an elastic deformation from 5% up to 1,000% (10 times of its original length), more typically from 10% to 800%, and further more typically from 30% to 300%, and most typically and desirably from 70% to 300%. It may be noted that although a metal typically has a high ductility (i.e. can be extended to a large extent without breakage), the majority of the deformation is plastic deformation (non-recoverable, permanent deformation) and only a small amount of elastic deformation (typically <1% and more typically <0.2%).

In some preferred embodiments, the high-elasticity polymer contains a lightly cross-linked network polymer chains having an ether linkage, nitrile-derived linkage, benzo peroxide-derived linkage, ethylene oxide linkage, propylene oxide linkage, vinyl alcohol linkage, cyanoresin linkage, tri-acrylate monomer-derived linkage, tetra-acrylate monomer-derived linkage, or a combination thereof, in the cross-linked network of polymer chains. These network or cross-linked polymers exhibit a unique combination of a high elasticity (high elastic deformation strain) and high lithium-ion conductivity.

In certain preferred embodiments, the high-elasticity polymer contains a lightly cross-linked network polymer chains selected from nitrile-containing polyvinyl alcohol chains, cyanoresin chains, pentaerythritol tetraacrylate (PETEA) chains, pentaerythritol triacrylate chains, ethoxylated trimethylolpropane triacrylate (ETPTA) chains, ethylene glycol methyl ether acrylate (EGMEA) chains, or a combination thereof.

Typically, a high-elasticity polymer is originally in a monomer or oligomer states that can be cured to form a cross-linked polymer that is highly elastic. Prior to curing, these polymers or oligomers are soluble in an organic solvent to form a polymer solution. Particles of a cathode active material (e.g. selenium-carbon hybrid particles, selenium-graphite hybrid particles, selenium-graphene hybrid particles, selenium compound particles, metal selenide particles, etc.) can be dispersed in this polymer solution to form a suspension (dispersion or slurry) of an active material particle-polymer (monomer or oligomer) mixture. This suspension can then be subjected to a solvent removal treatment while individual particles remain substantially separated from one another. The polymer (or monomer or oligomer) precipitates out to deposit on surfaces of these active material particles. This can be accomplished, for instance, via spray drying, ultrasonic spraying, air-assisted spraying, aerosolization, and other secondary particle formation procedures.

For instance, ethoxylated trimethylopropane triacrylate monomer (ETPTA, Mw=428, chemical formula given below), along with an initiator, can be dissolved in an organic solvent, such as ethylene carbonate (EC) or diethyl carbonate (DEC). Then, cathode active material particles (e.g. particles of Se, a Se alloy or mixture with Sn, Sb, Bi, S, or Te, a selenium compound, etc.) can be dispersed in the ETPTA monomer/solvent/initiator solution to form a slurry, which can be spray-dried to form ETPTA monomer/initiator-embraced anode particles. These embraced particles can then be thermally cured to obtain the particulates composed of anode particles encapsulated with a thin layer of a high-elasticity polymer. The polymerization and cross-linking reactions of this monomer can be initiated by a radical initiator derived from benzoyl peroxide (BPO) or AIBN through thermal decomposition of the initiator molecule. The ETPTA monomer has the following chemical formula:

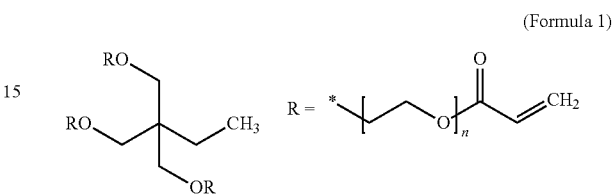

(Formula 1)

As another example, the high-elasticity polymer for encapsulation may be based on cationic polymerization and cross-linking of the cyanoethyl polyvinyl alcohol (PVA-CN, Formula 2) in succinonitrile (SN).

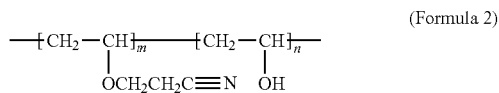

(Formula 2)

The procedure may begin with dissolving PVA-CN in succinonitrile ($NCCH_2CH_2CN$) to form a mixture solution. This is followed by adding an initiator into the mixture solution. For instance, $LiPF_6$ can be added into the PVA-CN/SN mixture solution at a weight ratio (selected from the preferred range from 20:1 to 2:1) to form a precursor solution. Then, particles of a selected cathode active material are introduced into the mixture solution to form a slurry. The slurry may then be subjected to a micro-encapsulation procedure to produce anode active material particles coated with an embracing layer of reacting mass, $PVA-CN/LiPF_6$. These embraced particles can then be heated at a temperature (e.g. from 75 to 100° C.) for 2 to 8 hours to obtain high-elasticity polymer-encapsulated anode active material particles. During this process, cationic polymerization and cross-linking of cyano groups on the PVA-CN may be initiated by $PF_5$, which is derived from the thermal decomposition of $LiPF_6$ at such an elevated temperature.

It is essential for these materials to form a lightly cross-linked network of polymer chains. In other words, the network polymer or cross-linked polymer should have a relatively low degree of cross-linking or low cross-link density to impart a high elastic deformation.

The cross-link density of a cross-linked network of polymer chains may be defined as the inverse of the molecular weight between cross-links (Mc). The cross-link density can be determined by the equation, $Mc = \rho RT/Ge$, where Ge is the equilibrium modulus as determined by a temperature sweep in dynamic mechanical analysis, ρ is the physical density, R is the universal gas constant in J/mol*K and T is absolute temperature in K. Once Ge and ρ are determined experimentally, then Mc and the cross-link density can be calculated.

The magnitude of Mc may be normalized by dividing the Mc value by the molecular weight of the characteristic repeat unit in the cross-link chain or chain linkage to obtain a number, Nc, which is the number of repeating units between two cross-link points. We have found that the elastic deformation strain correlates very well with Mc and Nc. The elasticity of a cross-linked polymer derives from a large number of repeating units (large Nc) between cross-links. The repeating units can assume a more relax conformation (e.g. random coil) when the polymer is not stressed. However, when the polymer is mechanically stressed, the linkage chain uncoils or gets stretched to provide a large deformation. A long chain linkage between cross-link points (larger Nc) enables a larger elastic deformation. Upon release of the load, the linkage chain returns to the more relaxed or coiled state. During mechanical loading of a polymer, the cross-links prevent slippage of chains that otherwise form plastic deformation (non-recoverable).

Preferably, the Nc value in a high-elasticity polymer is greater than 5, more preferably greater than 10, further more preferably greater than 100, and even more preferably greater than 200. These Nc values can be readily controlled and varied to achieve different elastic deformation values by using different cross-linking agents with different functionalities, and by designing the polymerization and cross-linking reactions to proceed at different temperatures for different periods of time.

Alternatively, Mooney-Rilvin method may be used to determine the degree of cross-linking. Crosslinking also can be measured by swelling experiments. In a swelling experiment, the crosslinked sample is placed into a good solvent for the corresponding linear polymer at a specific temperature, and either the change in mass or the change in volume is measured. The higher the degree of crosslinking, the less swelling is attainable. Based on the degree of swelling, the Flory Interaction Parameter (which relates the solvent interaction with the sample, Flory Huggins Eq.), and the density of the solvent, the theoretical degree of crosslinking can be calculated according to Flory's Network Theory. The Flory-Rehner Equation can be useful in the determination of cross-linking.

The high-elasticity polymer for encapsulation may contain a simultaneous interpenetrating network (SIN) polymer, wherein two cross-linking chains intertwine with each other, or a semi-interpenetrating network polymer (semi-IPN), which contains a cross-linked polymer and a linear polymer. An example of semi-IPN is an UV-curable/polymerizable trivalent/monovalent acrylate mixture, which is composed of ethoxylated trimethylolpropane triacrylate (ETPTA) and ethylene glycol methyl ether acrylate (EGMEA) oligomers. The ETPTA, bearing trivalent vinyl groups, is a photo (UV)-crosslinkable monomer, capable of forming a network of cross-linked chains. The EGMEA, bearing monovalent vinyl groups, is also UV-polymerizable, leading to a linear polymer with a high flexibility due to the presence of the oligomer ethylene oxide units. When the degree of cross-linking of ETPTA is moderate or low, the resulting ETPTA/EGMEA semi-IPN polymer provides good mechanical flexibility or elasticity and reasonable mechanical strength. The lithium-ion conductivity of this polymer is typically in the range from $10^{-4}$ to $5 \times 10^{-3}$ S/cm.

The high-elasticity polymer may form a mixture or blend with an electron-conducting polymer selected from polyaniline, polypyrrole, polythiophene, polyfuran, a bi-cyclic polymer, derivatives thereof (e.g. sulfonated versions), or a combination thereof.

In some embodiments, the high-elasticity polymer may form a mixture with a lithium ion-conducting polymer selected from poly(ethylene oxide) (PEO), polypropylene oxide (PPO), poly(acrylonitrile) (PAN), poly(methyl methacrylate) (PMMA), poly(vinylidene fluoride) (PVDF), poly bis-methoxy ethoxyethoxide-phosphazene, polyvinyl chloride, polydimethylsiloxane, poly(vinylidene fluoride)-hexafluoropropylene (PVDF-HFP), a derivative thereof (e.g. sulfonated versions), or a combination thereof.

The high-elasticity polymer may form a polymer blend with a conventional elastomer or rubber. Unsaturated rubbers that can be vulcanized to become elastomer include natural polyisoprene (e.g. cis-1,4-polyisoprene natural rubber (NR) and trans-1,4-polyisoprene gutta-percha), synthetic polyisoprene (IR for isoprene rubber), polybutadiene (BR for butadiene rubber), chloroprene rubber (CR), polychloroprene (e.g. Neoprene, Baypren etc.), butyl rubber (copolymer of isobutylene and isoprene, IIR), including halogenated butyl rubbers (chloro butyl rubber (CIIR) and bromo butyl rubber (BIIR), styrene-butadiene rubber (copolymer of styrene and butadiene, SBR), nitrile rubber (copolymer of butadiene and acrylonitrile, NBR), Some elastomers are saturated rubbers that cannot be cured by selenium vulcanization; they are made into a rubbery or elastomeric material via different means: e.g. by having a copolymer domain that holds other linear chains together. Each of these elastomers can be used to encapsulate particles of an anode active material by one of several means: melt mixing (followed by pelletizing and ball-milling, for instance), solution mixing (dissolving the anode active material particles in an uncured polymer, monomer, or oligomer, with or without an organic solvent) followed by drying (e.g. spray drying), interfacial polymerization, or in situ polymerization of elastomer in the presence of anode active material particles.

Saturated rubbers and related elastomers in this category include EPM (ethylene propylene rubber, a copolymer of ethylene and propylene), EPDM rubber (ethylene propylene diene rubber, a terpolymer of ethylene, propylene and a diene-component), epichlorohydrin rubber (ECO), polyacrylic rubber (ACM, ABR), silicone rubber (SI, Q, VMQ), fluorosilicone rubber (FVMQ), fluoroelastomers (FKM, and FEPM; such as Viton, Tecnoflon, Fluorel, Aflas and Dai-El), perfluoroelastomers (FFKM: Tecnoflon PFR, Kalrez, Chemraz, Perlast), polyether block amides (PEBA), chlorosulfonated polyethylene (CSM; e.g. Hypalon), and ethylene-vinyl acetate (EVA), thermoplastic elastomers (TPE), protein resilin, and protein elastin. Polyurethane and its copolymers (e.g. urea-urethane copolymer) are particularly useful elastomeric shell materials for encapsulating anode active material particles.

C. Encapsulation of Cathode Active Material Particles by a High-Elasticity Polymer Several micro-encapsulation processes require the high-elasticity polymer or its precursor (monomer or oligomer) to be dissolvable in a solvent. Fortunately, all the high-elasticity polymers or their precursors used herein are soluble in some common solvents. The un-cured polymer or its precursor can be readily dissolved in a common organic solvent to form a solution. This solution can then be used to encapsulate solid particles via several of the micro-encapsulation methods to be discussed in what follows. Upon encapsulation, the polymer shell is then polymerized and cross-linked.

There are three broad categories of micro-encapsulation methods that can be implemented to produce high-elasticity polymer-encapsulated particles of a cathode active material: physical methods, physico-chemical methods, and chemical methods. The physical methods include pan-coating, air-suspension coating, centrifugal extrusion, vibration nozzle, and spray-drying methods. The physico-chemical methods include ionotropic gelation and coacervation-phase separation methods. The chemical methods include interfacial polycondensation, interfacial cross-linking, in-situ polymerization, and matrix polymerization.

Pan-coating method: The pan coating process involves tumbling the active material particles in a pan or a similar device while the encapsulating material (e.g. monomer/oligomer, polymer melt, polymer/solvent solution) is applied slowly until a desired encapsulating shell thickness is attained.

Air-suspension coating method: In the air suspension coating process, the solid particles (core material) are dispersed into the supporting air stream in an encapsulating chamber. A controlled stream of a polymer-solvent solution (polymer or its monomer or oligomer dissolved in a solvent; or its monomer or oligomer alone in a liquid state) is concurrently introduced into this chamber, allowing the solution to hit and coat the suspended particles. These suspended particles are encapsulated (fully coated) with a polymer or its precursor molecules while the volatile solvent is removed, leaving a very thin layer of polymer (or its precursor, which is cured/hardened subsequently) on surfaces of these particles. This process may be repeated several times until the required parameters, such as full-coating thickness (i.e. encapsulating shell or wall thickness), are achieved. The air stream which supports the particles also helps to dry them, and the rate of drying is directly proportional to the temperature of the air stream, which can be adjusted for optimized shell thickness.

In a preferred mode, the particles in the encapsulating zone portion may be subjected to re-circulation for repeated coating. Preferably, the encapsulating chamber is arranged such that the particles pass upwards through the encapsulating zone, then are dispersed into slower moving air and sink back to the base of the encapsulating chamber, enabling repeated passes of the particles through the encapsulating zone until the desired encapsulating shell thickness is achieved.

Centrifugal extrusion: Active material particles may be encapsulated using a rotating extrusion head containing concentric nozzles. In this process, a stream of core fluid (slurry containing particles of an material dispersed in a solvent) is surrounded by a sheath of shell solution or melt. As the device rotates and the stream moves through the air it breaks, due to Rayleigh instability, into droplets of core, each coated with the shell solution. While the droplets are in flight, the molten shell may be hardened or the solvent may be evaporated from the shell solution. If needed, the capsules can be hardened after formation by catching them in a hardening bath. Since the drops are formed by the breakup of a liquid stream, the process is only suitable for liquid or slurry. A high production rate can be achieved. Up to 22.5 kg of microcapsules can be produced per nozzle per hour and extrusion heads containing 16 nozzles are readily available.

Vibrational nozzle method: Core-shell encapsulation or matrix-encapsulation of an active material can be conducted using a laminar flow through a nozzle and vibration of the nozzle or the liquid. The vibration has to be done in resonance with the Rayleigh instability, leading to very uniform droplets. The liquid can consist of any liquids with limited viscosities (1-50,000 mPa·s): emulsions, suspensions or slurry containing the active material. The solidification can be done according to the used gelation system with an internal gelation (e.g. sol-gel processing, melt) or an external (additional binder system, e.g. in a slurry).

Spray-drying: Spray drying may be used to encapsulate particles of an active material when the active material is dissolved or suspended in a melt or polymer solution. In spray drying, the liquid feed (solution or suspension) is atomized to form droplets which, upon contacts with hot gas, allow solvent to get vaporized and thin polymer shell to fully embrace the solid particles of the active material.

Coacervation-phase separation: This process consists of three steps carried out under continuous agitation:
(a) Formation of three immiscible chemical phases: liquid manufacturing vehicle phase, core material phase and encapsulation material phase. The core material is dispersed in a solution of the encapsulating polymer (or its monomer or oligomer). The encapsulating material phase, which is an immiscible polymer in liquid state, is formed by (i) changing temperature in polymer solution, (ii) addition of salt, (iii) addition of non-solvent, or (iv) addition of an incompatible polymer in the polymer solution.
(b) Deposition of encapsulation shell material: core material being dispersed in the encapsulating polymer solution, encapsulating polymer material coated around core particles, and deposition of liquid polymer embracing around core particles by polymer adsorbed at the interface formed between core material and vehicle phase; and
(c) Hardening of encapsulating shell material: shell material being immiscible in vehicle phase and made rigid via thermal, cross-linking, or dissolution techniques.

Interfacial polycondensation and interfacial cross-linking: Interfacial polycondensation entails introducing the two reactants to meet at the interface where they react with each other. This is based on the concept of the Schotten-Baumann reaction between an acid chloride and a compound containing an active hydrogen atom (such as an amine or alcohol), polyester, polyurea, polyurethane, or urea-urethane condensation. Under proper conditions, thin flexible encapsulating shell (wall) forms rapidly at the interface. A solution of the active material and a diacid chloride are emulsified in water and an aqueous solution containing an amine and a polyfunctional isocyanate is added. A base may be added to neutralize the acid formed during the reaction. Condensed polymer shells form instantaneously at the interface of the emulsion droplets. Interfacial cross-linking is derived from interfacial polycondensation, wherein cross-linking occurs between growing polymer chains and a multi-functional chemical groups to form an elastomer shell material.

In-situ polymerization: In some micro-encapsulation processes, active materials particles are fully coated with a monomer or oligomer first. Then, direct polymerization and cross-linking of the monomer or oligomer is carried out on the surfaces of these material particles.

Matrix polymerization: This method involves dispersing and embedding a core material in a polymeric matrix during formation of the particles. This can be accomplished via spray-drying, in which the particles are formed by evaporation of the solvent from the matrix material. Another possible route is the notion that the solidification of the matrix is caused by a chemical change.

Figure 2:
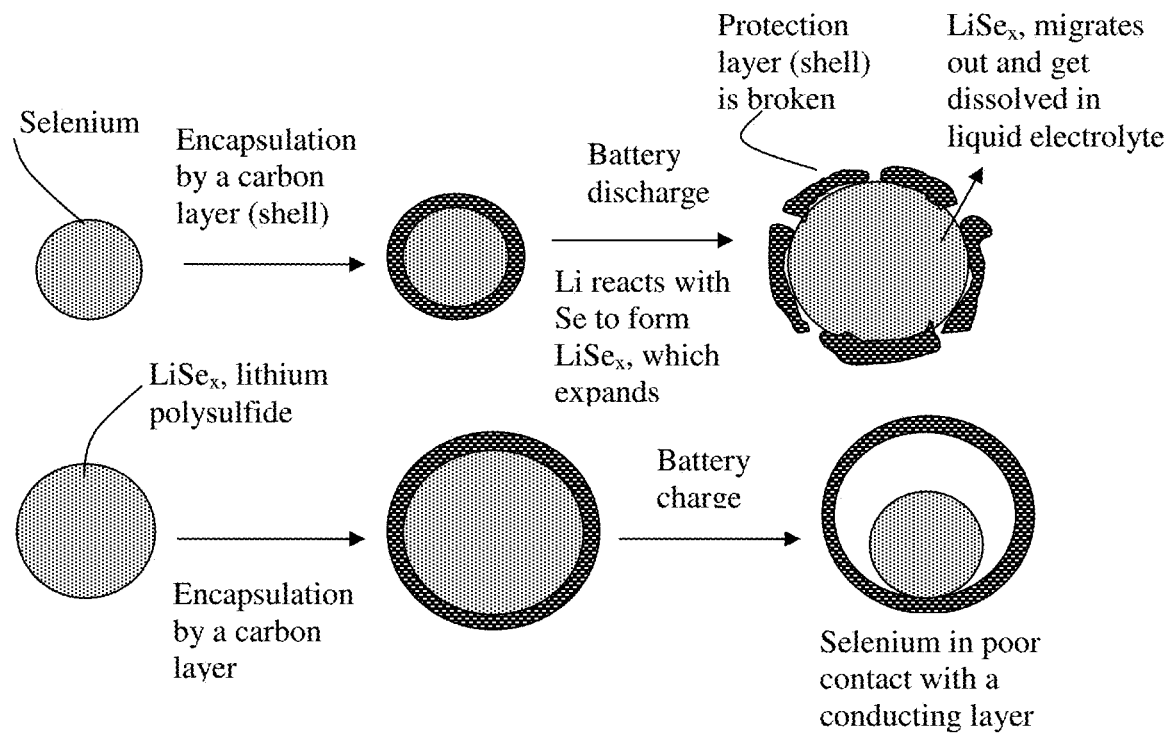
FIG. 2 Schematic illustrating the notion that expansion/shrinkage of electrode active material particles, upon lithium insertion and de-insertion during discharge/charge of a prior art lithium-ion battery, can lead to detachment of resin binder from the particles, interruption of the conductive paths formed by the conductive additive, and loss of contact with the current collector.

D. Additional Details about the Encapsulated Particulates, the Cathode Layer, and the Structure of Li—Se, Na—Se, and K—Se Cells The anode active material layer of an alkali metal-selenium cell can contain a foil or coating of Li, Na, or K metal supported by a current collector (e.g. Cu foil), as illustrated in the left-hand portion of FIG. 1(A) for a prior art Li—Se cell. Alternatively, the anode active material may contain, for instance, particles of prelithiated Si particles or surface-stabilized Li particles, as illustrated in the left-hand portion of FIG. 2(B). However, the cathode layer in the instant cell is distinct, as already discussed above.

The electrolyte for an alkali metal-selenium cell may be an organic electrolyte, ionic liquid electrolyte, gel polymer electrolyte, solid-state electrolyte (e.g. polymer solid electrolyte or inorganic solid electrolyte), quasi-solid electrolyte or a combination thereof. The electrolyte typically contains an alkali metal salt (lithium salt, sodium salt, and/or potassium salt) dissolved in a solvent.

The solvent may be selected from 1,3-dioxolane (DOL), 1,2-dimethoxyethane (DME), tetraethylene glycol dimethylether (TEGDME), poly(ethylene glycol) dimethyl ether (PEGDME), diethylene glycol dibutyl ether (DEGDBE), 2-ethoxyethyl ether (EEE), sulfone, sulfolane, ethylene carbonate (EC), dimethyl carbonate (DMC), methylethyl carbonate (MEC), diethyl carbonate (DEC), ethyl propionate, methyl propionate, propylene carbonate (PC), gamma-butyrolactone (γ-BL), acetonitrile (AN), ethyl acetate (EA), propyl formate (PF), methyl formate (MF), toluene, xylene, methyl acetate (MA), fluoroethylene carbonate (FEC), vinylene carbonate (VC), allyl ethyl carbonate (AEC), a hydrofluoroether, a room temperature ionic liquid solvent, or a combination thereof.

The electrolytic salts to be incorporated into a non-aqueous electrolyte may be selected from a lithium salt, sodium salt, or potassium salt such as lithium perchlorate ($LiClO_4$), lithium hexafluorophosphate ($LiPF_6$), lithium borofluoride ($LiBF_4$), lithium hexafluoroarsenide ($LiAsF_6$), lithium trifluoro-metasulfonate ($LiCF_3SO_3$), bis-trifluoromethyl sulfonylimide lithium [$LiN(CF_3SO_2)_2$], lithium bis(oxalato)borate (LiBOB), lithium oxalyldifluoroborate ($LiBF_2C_2O_4$), lithium oxalyldifluoroborate ($LiBF_2C_2O_4$), lithium nitrate ($LiNO_3$), Li-fluoroalkyl-phosphates ($LiPF_3(CF_2CF_3)_3$), lithium bisperfluoroethysulfonylimide (LiBETI), an ionic liquid salt, sodium perchlorate ($NaClO_4$), potassium perchlorate ($KClO_4$), sodium hexafluorophosphate ($NaPF_6$), potassium hexafluorophosphate ($KPF_6$), sodium borofluoride ($NaBF_4$), potassium borofluoride ($KBF_4$), sodium hexafluoroarsenide, potassium hexafluoroarsenide, sodium trifluoro-metasulfonate ($NaCF_3SO_3$), potassium trifluoro-metasulfonate ($KCF_3SO_3$), bis-trifluoromethyl sulfonylimide sodium ($NaN(CF_3SO_2)_2$), sodium trifluoromethanesulfonimide (NaTFSI), and bis-trifluoromethyl sulfonylimide potassium ($KN(CF_3SO_2)_2$). Among them, $LiPF_6$, $LiBF_4$ and $LiN(CF_3SO_2)_2$ are preferred for Li—Se cells, $NaPF_6$ and $LiBF_4$ for Na—Se cells, and $KBF_4$ for K—Se cells. The content of aforementioned electrolytic salts in the non-aqueous solvent is preferably 0.5 to 3.0 M (mol/L) at the cathode side and 3.0 to >10 M at the anode side.

The ionic liquid is composed of ions only. Ionic liquids are low melting temperature salts that are in a molten or liquid state when above a desired temperature. For instance, a salt is considered as an ionic liquid if its melting point is below 100° C. If the melting temperature is equal to or lower than room temperature (25° C.), the salt is referred to as a room temperature ionic liquid (RTIL). The IL salts are characterized by weak interactions, due to the combination of a large cation and a charge-delocalized anion. This results in a low tendency to crystallize due to flexibility (anion) and asymmetry (cation).

A typical and well-known ionic liquid is formed by the combination of a 1-ethyl-3-methylimidazolium (EMI) cation and an N,N-bis(trifluoromethane)sulfonamide (TFSI) anion. This combination gives a fluid with an ionic conductivity comparable to many organic electrolyte solutions and a low decomposition propensity and low vapor pressure up to ~300-400° C. This implies a generally low volatility and non-flammability and, hence, a much safer electrolyte for batteries.

Ionic liquids are basically composed of organic ions that come in an essentially unlimited number of structural variations owing to the preparation ease of a large variety of their components. Thus, various kinds of salts can be used to design the ionic liquid that has the desired properties for a given application. These include, among others, imidazolium, pyrrolidinium and quaternary ammonium salts as cations and bis(trifluoromethanesulfonyl) imide, bis(fluorosulfonyl)imide, and hexafluorophosphate as anions. Based on their compositions, ionic liquids come in different classes that basically include aprotic, protic and zwitterionic types, each one suitable for a specific application.

Common cations of room temperature ionic liquids (RTILs) include, but not limited to, tetraalkylammonium, di-, tri-, and tetra-alkylimidazolium, alkylpyridinium, dialkyl-pyrrolidinium, dialkylpiperidinium, tetraalkylphosphonium, and trialkylsulfonium. Common anions of RTILs include, but not limited to, $BF_4^-$, $B(CN)_4^-$, $CH_3BF_3^-$, $CH_2CHBF_3^-$, $CF_3BF_3^-$, $C_2F_5BF_3^-$, n-$C_3F_7BF_3^-$, n-$C_4F_9BF_3^-$, $PF_6^-$, $CF_3CO_2^-$, $CF_3SO_3^-$, $N(SO_2CF_3)_2^-$, $N(COCF_3)(SO_2CF_3)^-$, $N(SO_2F)_2^-$, $N(CN)_2^-$, $C(CN)_3^-$, $SCN^-$, $SeCN^-$, $CuCl_2^-$, $AlCl_4^-$, $F(HF)_{2,3}^-$, etc. Relatively speaking, the combination of imidazolium- or sulfonium-based cations and complex halide anions such as $BF_4^-$, $CF_3CO_2^-$, $CF_3SO_3^-$, $NTf_2^-$, $N(SO_2F)_2^-$, or $F(HF)_{2,3}^-$ results in RTILs with good working conductivities.

RTILs can possess archetypical properties such as high intrinsic ionic conductivity, high thermal stability, low volatility, low (practically zero) vapor pressure, non-flammability, the ability to remain liquid at a wide range of temperatures above and below room temperature, high polarity, high viscosity, and wide electrochemical windows. These properties, except for the high viscosity, are desirable attributes when it comes to using an RTIL as an electrolyte ingredient (a salt and/or a solvent) in a Li—Se cell.

In the presently invented products (including the alkali metal cell, the cathode active layer, and the cathode active material powder), the core material (to be encapsulated by a thin layer of high-elasticity polymer) contains the selenium-carbon hybrid, selenium-graphite hybrid, selenium-graphene hybrid, conducting polymer-selenium hybrid, metal selenide, selenium compound, etc. These hybrid or compound materials are produced in the form of particles that contain a mixture, blend, composite, or bonded entity of selenium or selenide with a carbon, graphite, graphene, or conducting polymer material. Metal selenides (e.g. lithium polyselenide, sodium polyselenide, etc.) and selenium compounds are readily available in a fine particle form. Selenium can be combined with a conducting material (carbon, graphite, graphene, and/or conducting polymer) to form a composite, mixture, or bonded entity (e.g. selenium bonded on graphene oxide surface).

There are many well-known procedures that can be used to make the aforementioned selenium-containing materials into particles. For instance, one may mix solid selenium with a carbon or graphite material to form composite particles using ball-milling. The resulting particles are typically ellipsoidal or potato-like in shape having a size from 1 to 20 μm. Also, one may infiltrate Se or selenide into the pores of porous carbon or graphite particles (e.g. activated carbon, mesoporous carbon, activated carbon fibers, etc.) using vapor phase infiltration, solution infiltration, chemical infiltration, or electrochemical infiltration. Alternatively, one may deposit selenium onto surfaces of graphene sheets, CNTs, carbon nanofibers, etc. and then form these Se-coated nanomaterials into a spherical or ellipsoidal shape using high-intensity ball-milling, spray-drying (of their suspensions), aerosol formation, etc. These particles are then encapsulated with a high-elasticity polymer using the micro-encapsulation processes discussed above.

The cathode in a conventional Li—Se cell typically has less than 70% by weight of selenium in a composite cathode composed of selenium and the conductive additive/support. Even when the selenium content in the prior art composite cathode reaches or exceeds 70% by weight, the specific capacity of the composite cathode is typically significantly lower than what is expected based on theoretical predictions. For instance, the theoretical specific capacity of selenium is 675 mAh/g. A composite cathode composed of 70% selenium (Se) and 30% carbon black (CB), without any binder, should be capable of storing up to 675×70%=472 mAh/g. Unfortunately, the observed specific capacity is typically less than 75% of 472 mAh/g or 354 mAh/g (often less than 50% or 236 mAh/g in this example) of what could be achieved. In other words, the active material (Se) utilization rate is typically less than 75% (or even <50%). This has been a major issue in the art of Li—Se cells and there has been no solution to this problem.

Thus, it is highly advantageous to obtain a high selenium loading and yet, concurrently, maintaining an ultra-thin/small thickness/diameter of selenium for significantly enhanced selenium utilization efficiency, energy density and power density. For instance, one can deposit nanoscaled selenium (1-5 nm thick) on graphene surfaces using chemical, electrochemical, or vapor deposition to form Se-coated or Se-bonded graphene sheets. These Se-coated or Se-bonded graphene sheets are then aggregated together using a tumbling mixing, ball-milling, or spraying procedure. These steps enable the preparation of Se-conducting material hybrids that contain 85%-99% by weight selenium, yet maintaining a coating thickness or particle diameter from 1 nm to 5 nm. This ultra-small dimension enables fast lithium diffusion and lithium-selenium reactions, leading to high Se utilization efficiency (hence, high energy density) even at high charge-discharge rates. By implementing a high-elasticity polymer around these hybrid particles or selenium compound/selenide particles, we have significantly reduced and even eliminated the shuttling effect, resulting in an alkali metal battery that has long cycle-life.

Again, the shuttling effect is related to the tendency for selenium or alkali metal polyselenide that forms at the cathode to get dissolved in the solvent and for the dissolved lithium polyselenide species to migrate from the cathode to the anode, where they irreversibly react with lithium to form species that prevent selenide from returning back to the cathode during the subsequent discharge operation of the Li—Se cell (the detrimental shuttling effect). It appears that the embracing high-elasticity polymer has effectively trapped selenium and metal polyselenide therein, thereby preventing or reducing such a dissolution and migration issue. We have solved the most critical, long-standing problem of alkali metal-selenium batteries.

The anode active material may contain, as an example, lithium metal foil or a high-capacity Si, Sn, or $SnO_2$ capable of storing a great amount of lithium. The cathode active material may contain pure selenium (if the anode active material contains lithium), lithium polyselenide, or any selenium containing compound, molecule, or polymer. If the cathode active material includes lithium-containing species (e.g. lithium polyselenide) when the cell is made, the anode active material can be any material capable of storing a large amount of lithium (e.g. Si, Ge, Sn, $SnO_2$, etc.).

At the anode side, when lithium metal is used as the sole anode active material in a Li—Se cell, there is concern about the formation of lithium dendrites, which could lead to internal shorting and thermal runaway. Herein, we have used two approaches, separately or in combination, to address this dendrite formation issue: one involving the use of a high-concentration electrolyte at the anode side and the other the use of a nanostructure composed of conductive nanofilaments. For the latter, multiple conductive nanofilaments are processed to form an integrated aggregate structure, preferably in the form of a closely packed web, mat, or paper, characterized in that these filaments are intersected, overlapped, or somehow bonded (e.g., using a binder material) to one another to form a network of electron-conducting paths. The integrated structure has substantially interconnected pores to accommodate electrolyte. The nanofilament may be selected from, as examples, a carbon nanofiber (CNF), graphite nanofiber (GNF), carbon nanotube (CNT), metal nanowire (MNW), conductive nanofibers obtained by electrospinning, conductive electrospun composite nanofibers, nanoscaled graphene platelet (NGP), or a combination thereof. The nanofilaments may be bonded by a binder material selected from a polymer, coal tar pitch, petroleum pitch, mesophase pitch, coke, or a derivative thereof.

Nanofibers may be selected from the group consisting of an electrically conductive electrospun polymer fiber, electrospun polymer nanocomposite fiber comprising a conductive filler, nanocarbon fiber obtained from carbonization of an electrospun polymer fiber, electrospun pitch fiber, and combinations thereof. For instance, a nanostructured electrode can be obtained by electro-spinning of polyacrylonitrile (PAN) into polymer nanofibers, followed by carbonization of PAN. It may be noted that some of the pores in the structure, as carbonized, are greater than 100 nm and some smaller than 100 nm.

The presently invented cathode active layer may be incorporated in one of at least four broad classes of rechargeable lithium metal cells (or, similarly, for sodium metal or potassium metal cells):

(A) Lithium metal-selenium with a conventional anode configuration: The cell contains an optional cathode current collector, a presently invented cathode layer, a separator/electrolyte, and an anode current collector. Potential dendrite formation may be overcome by using a high-concentration electrolyte or solid-state electrolyte at the anode.

(B) Lithium metal-selenium cell with a nanostructured anode configuration: The cell contains an optional cathode current collector, a cathode herein invented, a separator/electrolyte, an optional anode current collector, and a nanostructure to accommodate lithium metal that is deposited back to the anode during a charge or re-charge operation. This nanostructure (web, mat, or paper) of nanofilaments provide a uniform electric field enabling uniform Li metal deposition, reducing the propensity to form dendrites. This configuration can provide a dendrite-free cell for a long and safe cycling behavior.

(C) Lithium ion-selenium cell with a conventional anode: For instance, the cell contains an anode composed of anode active graphite particles bonded by a binder, such as polyvinylidene fluoride (PVDF) or styrene-butadiene rubber (SBR). The cell also contains a cathode current collector, a cathode of the instant invention, a separator/electrolyte, and an anode current collector; and (D) Lithium ion-selenium cell with a nanostructured anode: For instance, the cell contains a web of nanofibers coated with Si coating or bonded with Si nanoparticles. The cell also contains an optional cathode current collector, a cathode herein invented, a separator/electrolyte, and an anode current collector. This configuration provides an ultra-high capacity, high energy density, and a safe and long cycle life.

In the lithium-ion selenium cell (e.g. as described in (C) and (D) above), the anode active material can be selected from a wide range of high-capacity materials, including (a) silicon (Si), germanium (Ge), tin (Sn), lead (Pb), antimony (Sb), bismuth (Bi), zinc (Zn), aluminum (Al), nickel (Ni), cobalt (Co), manganese (Mn), titanium (Ti), iron (Fe), and cadmium (Cd), and lithiated versions thereof; (b) alloys or intermetallic compounds of Si, Ge, Sn, Pb, Sb, Bi, Zn, Al, or Cd with other elements, and lithiated versions thereof, wherein said alloys or compounds are stoichiometric or non-stoichiometric; (c) oxides, carbides, nitrides, selenides, phosphides, selenides, and tellurides of Si, Ge, Sn, Pb, Sb, Bi, Zn, Al, Fe, Ni, Co, Ti, Mn, or Cd, and their mixtures or composites, and lithiated versions thereof; (d) salts and hydroxides of Sn and lithiated versions thereof; (e) carbon or graphite materials and prelithiated versions thereof; and combinations thereof. Non-lithiated versions may be used if the cathode side contains lithium polyselenides or other lithium sources when the cell is made.

A possible lithium metal cell may be comprised of an anode current collector, an electrolyte phase (optionally but preferably supported by a porous separator, such as a porous polyethylene-polypropylene co-polymer film), a cathode of the instant invention, and an optional cathode collector.

For a sodium ion-selenium cell or potassium ion-selenium cell, the anode active material layer can contain an anode active material selected from the group consisting of: (a) Sodium- or potassium-doped silicon (Si), germanium (Ge), tin (Sn), lead (Pb), antimony (Sb), bismuth (Bi), zinc (Zn), aluminum (Al), titanium (Ti), cobalt (Co), nickel (Ni), manganese (Mn), cadmium (Cd), and mixtures thereof; (b) Sodium- or potassium-containing alloys or intermetallic compounds of Si, Ge, Sn, Pb, Sb, Bi, Zn, Al, Ti, Co, Ni, Mn, Cd, and their mixtures; (c) Sodium- or potassium-containing oxides, carbides, nitrides, selenides, phosphides, selenides, tellurides, or antimonides of Si, Ge, Sn, Pb, Sb, Bi, Zn, Al, Fe, Ti, Co, Ni, Mn, Cd, and mixtures or composites thereof; (d) Sodium or potassium salts; (e) particles of graphite, hard carbon, soft carbon or carbon particles and pre-sodiated versions thereof (pre-doped or pre-loaded with Na), and combinations thereof.

The following examples are presented primarily for the purpose of illustrating the best mode practice of the present invention and should not be construed as limiting the scope of the present invention.

Example 1: Preparation of Se Nanoparticles from SeO$_2$ and Ascorbic Acid

The starting materials include SeO$_2$, ascorbic acid (Vc) and polysaccharides (CTS and CMC, separately). The CTS is a water-soluble chitosan having a 73.5% degree of deacetylation and viscosity-average molecular weight of 4200; and CMC is carboxymethyl cellulose having a degree of substitution of 0.8 and molecular weight of 110,000. The aqueous solutions of the materials were obtained by, for instance, dissolving 0.4 g of SeO$_2$ in 150 mL of de-ionized water under vigorous stirring.

For the preparation of selenium nanoparticles, appropriate amounts of polysaccharides, such as CTS or CMC solutions, were mixed with selenious acid solution (the aqueous solution of SeO$_2$), respectively. Subsequently, the ascorbic acid solution was added into the mixtures to initiate the reaction. In the reaction solution, the typical concentrations of CTS, CMC, selenious acid and ascorbic acid were 0.04%, 0.25%, $1\times10^{-3}$ and $4\times10^{-3}$M, respectively. No stirring was conducted except the initial mixing of the reactants. The selenious acid solutions were converted from colorless to red gradually after the addition of the ascorbic acid. The resulting product mixtures were then dried in a vacuum oven to collect Se nanoparticle powders. The reactions may be accelerated by using a slightly higher temperature (e.g. 80° C. instead of room temperature) and/or assisted by ultrasonic treatment.

Example 2: Preparation of Se Nanoparticles and Graphene-Wrapped Se from Na$_2$SeO$_3$ and GO Hollow and solid Se nanospheres were produced from Na$_2$SeO$_3$ by varying the amount of cetyltrimethyl ammonium bromide (CTAB) in the reaction system. In a representative procedure, 0.025 mol of sodium selenite (Na$_2$SeO$_3$) and 0.05 mol of ascorbic acid were separately dissolved in 50 mL mixed solution (Vwater/Vethanol=1:1) with the assistance of CTAB at ambient temperature. After adding the ascorbic acid, the red solution turned to brick red. The color phenomenon was due to the formation of a-Se particles. After 18 h, the products were washed with water and absolute ethanol. Subsequently the product changed progressively from red to gray, indicating that the amorphous Se phase had transformed to a trigonal phase (t-Se). The content of CTAB could be changed to get different morphologies of the nano Se.

Example 3: Preparation of Selenium Nanowires

Selenium nanowires were synthesized from SeO$_2$. In a typical reaction process, SeO$_2$ (0.25 g) and β-cyclodextrin (0.25 g) were added into a glass beaker containing 50 mL distilled water. The mixture was stirred for about 10 min to give a clear solution, which was promptly poured into another glass beaker containing ascorbic acid solution (50 mL, 0.028M) under continuous stirring. After reacting for 4 h, the product was collected by centrifugation and washed with deionized water and absolute ethanol several times. Then it was re-dispersed in ethanol and allowed to age for 2 h without stirring. Subsequently, the products were dried in a vacuum at 60° C. for 5 h to recover Se nanowires.

Example 4: Hydrothermal Synthesis of Se Nanowires from (NH$_4$)$_2$S$_2$O$_3$ and Na$_2$SeO$_3$ A low-temperature hydrothermal synthesis route was conducted for direct production of crystalline trigonal selenium nanowires, using (NH$_4$)$_2$S$_2$O$_3$ and Na$_2$SeO$_3$ as the starting materials in the presence of a surfactant, sodium dodecyl sulfate (SDS). In a typical procedure, equivalent molar amounts of (NH$_4$)$_2$S$_2$O$_3$ and Na$_2$SeO$_3$ (10 mmol) were added to an aqueous solution (50 mL) of SDS (0.325 g). The solution was stirred for approximately 20 min until the solids had completely dissolved, and a 0.2 M homogeneous solution was formed. The solution was then transferred to a Teflon-lined autoclave having a capacity of 60 mL. The autoclave was sealed and heated at 110° C. for 17 h, and then allowed to cool to room temperature naturally over a period of about 5 h. The resulting precipitate was rinsed with distilled water and absolute alcohol several times. After drying in vacuo at 40° C. for 4 h, the orange-red powders were collected. The hydrothermal synthesis of t-Se nanowires may be described by the following chemical reaction:

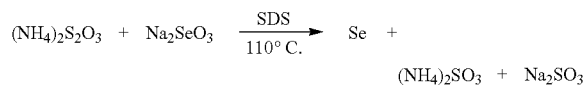

The product yield was approximately 95%.

Example 5: Preparation of Se Nanoplatelets

In a typical synthesis procedure, 1 mmol commercial Se powder and 20 mL ethylenediamine were poured into a Teflon-lined autoclave with a capacity of 30 mL. The autoclave was sealed and maintained at 160° C. for 2 h and then cooled to room temperature to produce a brown homogeneous solution. Subsequently, 100 mL acetone at −18° C. was injected into the brown homogeneous solution, and a brick-red mixture was obtained. After aging the brick-red mixture for 24 hours at −18° C., the precipitates were centrifuged, washed several times with distilled water and absolute alcohol, and finally dried in air at 60° C. for 24 h. The powder was then subjected to ball-milling for 30-60 minutes to obtain Se nanoplatelets. Some of the Se nanoplatelets were poured into a graphene suspension obtained in Example 9 to make a slurry, which was spray-dried to yield pristine graphene-wrapped Se nanoplatelets.

Example 6: Preparation of Tetragonal Selenium Nanowires and Nanotubes

In a typical procedure of synthesizing Se nanowires, 0.52 g $Na_2SeO_3$ and 2 g glucose were dissolved in 320 mL water hosted in a 500 mL beaker. After mixing for 20 min under vigorous magnetic stirring, the beaker containing the mixture solution was sealed and maintained in an oven at 85° C. A hot turbid brick-red solution was obtained, indicating the amorphous selenium being generated. The hot solution was cooled down by cold water in order to quench the reaction. The product was collected by centrifugation and washed several times with deionized water to remove the impurities. The final brick-red product was re-dispersed in 10 mL absolute ethanol to form a dispersion in a glass bottle, and then sealed and stored in darkness for further growth of Se nanowires. After this dispersion was aged for one week at room temperature, a sponge-like black-gray solid (containing Se nanowires) was formed at the bottom and the color of upper solution changed to colorless transparent. The synthesis of Se nanotubes was conducted under different conditions: 1.03 g $Na_2SeO_3$ and 3 g glucose were dissolved in 100 mL water hosted in a 250 mL beaker. After the solution was under constant stirring for 20 min, the beaker containing the mixture solution was sealed and then maintained at 85° C. for 4 h in an oven.

Example 7: The Ethoxylated Trimethylopropane Triacrylate Monomer-Derived High-Elasticity Polymer In a representative procedure, the ethoxylated trimethylopropane triacrylate monomer (ETPTA, Mw=428, Sigma-Aldrich) was dissolved in a solvent mixture of ethylene carbonate (EC)/diethyl carbonate (DEC), at a weight-based composition ratios of the ETPTA/solvent of 3/97 (w/w). Subsequently, benzoyl peroxide (BPO, 1.0 wt. % relative to the ETPTA content) was added as a radical initiator to allow for thermal crosslinking reaction after mixing with cathode particles. Then, cathode active material particles (e.g. Se-graphene particles) were dispersed in the ETPTA monomer/solvent/initiator solution to form a slurry, which was spray-dried to form ETPTA monomer/initiator-embraced Se-graphene particles. These embraced particles were then thermally cured at 60° C. for 30 min to obtain the particulates composed of Se-graphene particles encapsulated with a thin layer of a high-elasticity polymer. The ETPTA polymer shell thickness was varied from 1.3 nm to 115 nm.

On a separate basis, some amount of the ETPTA monomer/solvent/initiator solution was cast onto a glass surface to form a wet film, which was thermally dried and then cured at 60° C. for 30 min to form a film of cross-linked polymer. In this experiment, the BPO/ETPTA weight ratio was varied from 0.1% to 4% to vary the degree of cross-linking in several different polymer films. Some of the cured polymer samples were subjected to dynamic mechanical testing to obtain the equilibrium dynamic modulus, Ge, for the determination of the number average molecular weight (Mc) between two cross-link points and the corresponding number of repeat units (Nc), as a means of characterizing the degree of cross-linking.

Figure 5:
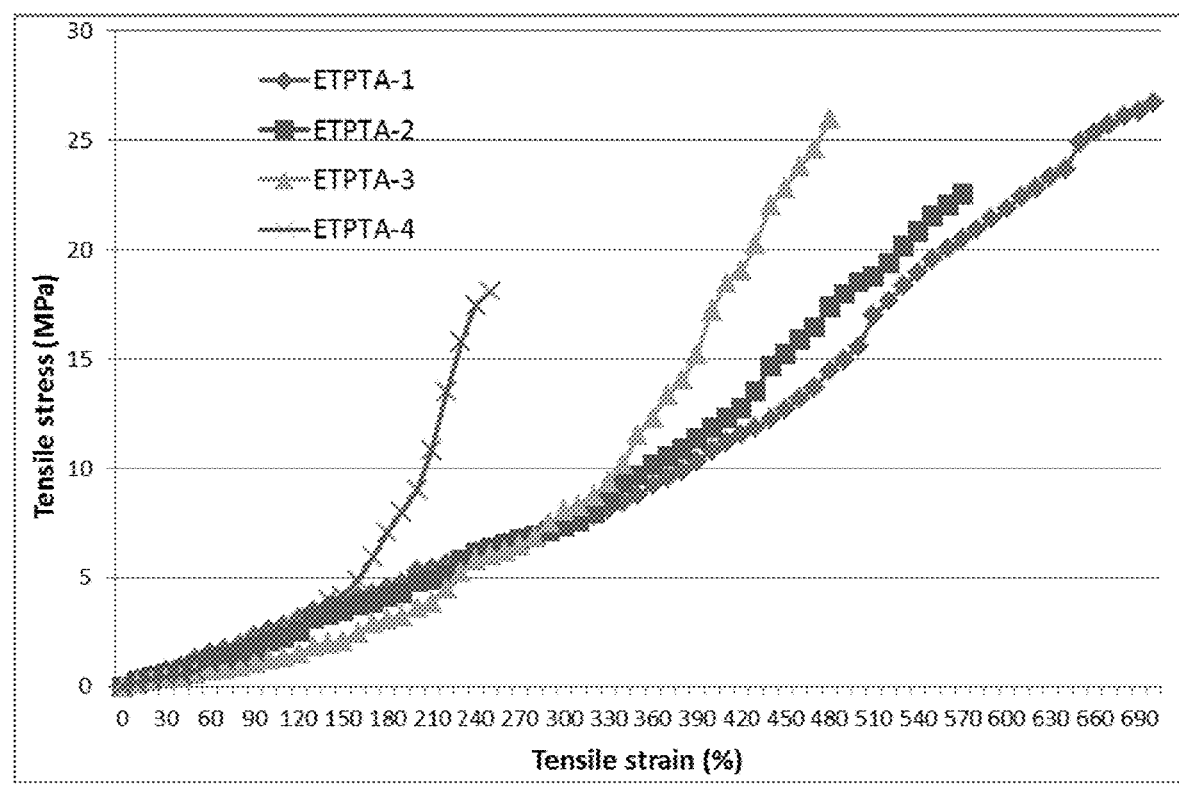
FIG. 5 Representative tensile stress-strain curves of four BPO-initiated cross-linked ETPTA polymers.

Several tensile testing specimens were cut from each cross-link film and tested with a universal testing machine. The representative tensile stress-strain curves of four BPO-initiated cross-linked ETPTA polymers are shown in FIG. 5, which indicate that this series of network polymers have an elastic deformation from approximately 230% to 700%. These data are for neat polymers without any additive. The addition of up to 30% by weight of a lithium salt typically reduces this elasticity down to a reversible tensile strain from 10% to 100%.

Example 8: Preparation of Cyanoethyl Polyvinyl Alcohol (PVA-CN)-Derived High-Elasticity Polymer The high-elasticity polymer for encapsulation of several selenium- and lithium polyselenide-based cathode particles was based on cationic polymerization and cross-linking of the cyanoethyl polyvinyl alcohol (PVA-CN) in succinonitrile (SN). The procedure began with dissolving PVA-CN in succinonitrile to form a mixture solution. This step was followed by adding an initiator into the solution. For the purpose of incorporating some lithium species into the high elasticity polymer, we chose to use $LiPF_6$ as an initiator. The ratio between $LiPF_6$ and the PVA-CN/SN mixture solution was varied from 1/20 to 1/2 by weight to form a series of precursor solutions. Subsequently, particles of a selected cathode active material (Se nanoparticles, Se nanowires, and $Li_2Se$ particles, respectively) and their graphene-embraced versions were introduced into these solutions to form a series of slurries. The slurries were then separately subjected to a micro-encapsulation procedure to produce cathode active material particles having entire exterior surfaces being coated with an embracing layer of the reacting mass, PVA-CN/$LiPF_6$. These embraced particles were then heated at a temperature from 75 to 100° C. for 2 to 8 hours to obtain high-elasticity polymer-encapsulated active material particles.

Figure 6:
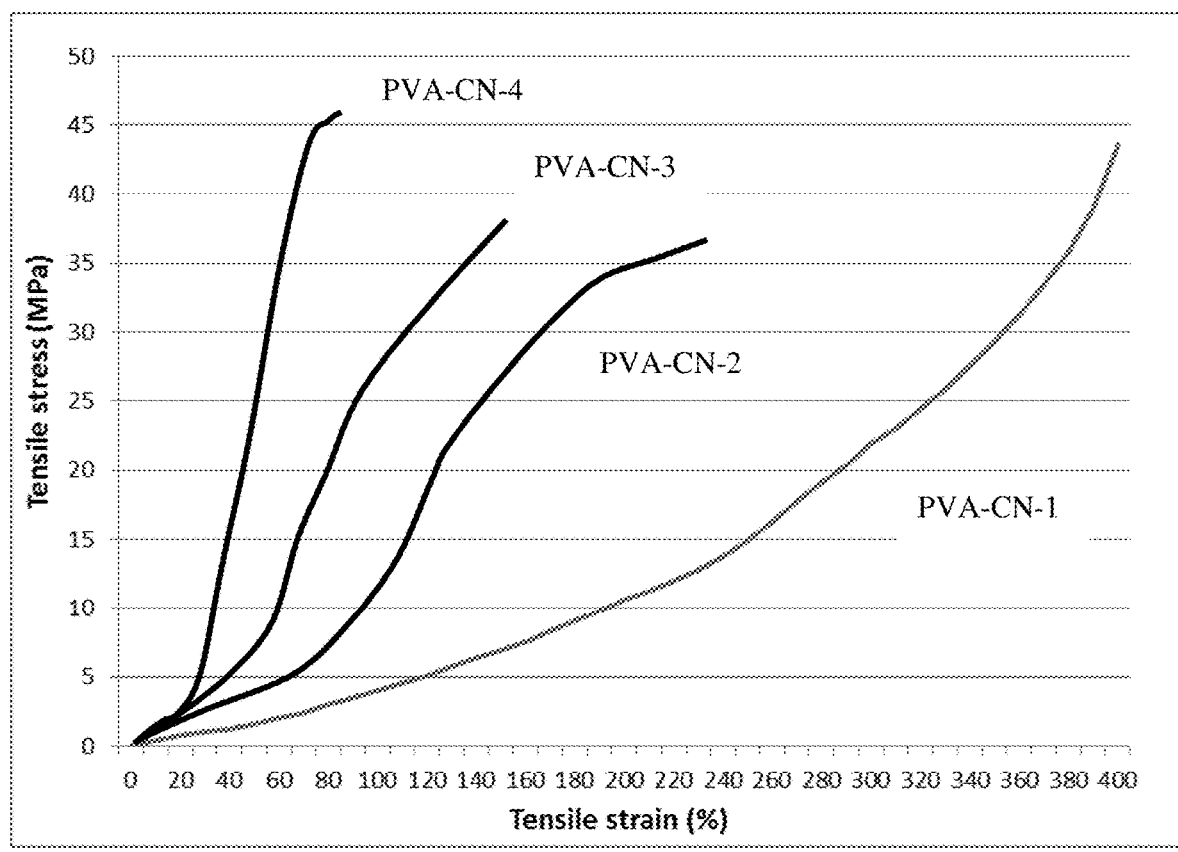
FIG. 6 Representative tensile stress-strain curves of four PF5-initiated cross-linked PVA-CN polymers.

Separately, the reacting mass, PVA-CN/LiPF$_6$, was cast onto a glass surface to form several films which were polymerized and cured to obtain cross-linked polymers having different degrees of cross-linking. Tensile testing was also conducted on these films and some testing results are summarized in FIG. 6. This series of cross-linked polymers can be elastically stretched up to approximately 80% (higher degree of cross-linking) to 400% (lower degree of cross-linking).

Example 9: Preparation of Pentaerythritol Tetraacrylate (PETEA)-Derived High-Elasticity Polymer For encapsulation of selenium-carbon, selenium-graphite, and selenium-polymer hybrid particles, pentaerythritol tetraacrylate (PETEA), Formula 3, was used as a monomer:

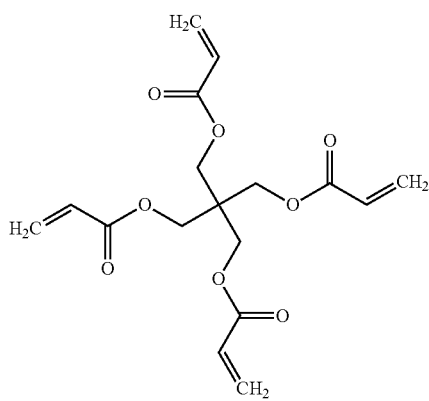

(Formula 3)

The precursor solution was typically composed of 1.5 wt. % of PETEA (C$_{17}$H$_{20}$O$_8$) monomer and 0.1 wt. % of azodiisobutyronitrile (AIBN, C$_8$H$_{12}$N$_4$) initiator dissolved in a solvent mixture of 1,2-dioxolane (DOL)/dimethoxymethane (DME)(1:1 by volume). Different selenium-based hybrid particles were added into the precursor solution and were encapsulated with a thin layer of PETEA/AMN/solvent precursor solution via the spray-drying method (some solvent evaporated, but some remained). The precursor solution was polymerized and cured at 70° C. for half an hour to obtain particulates composed of high-elasticity polymer-encapsulated particles.

Figure 7:
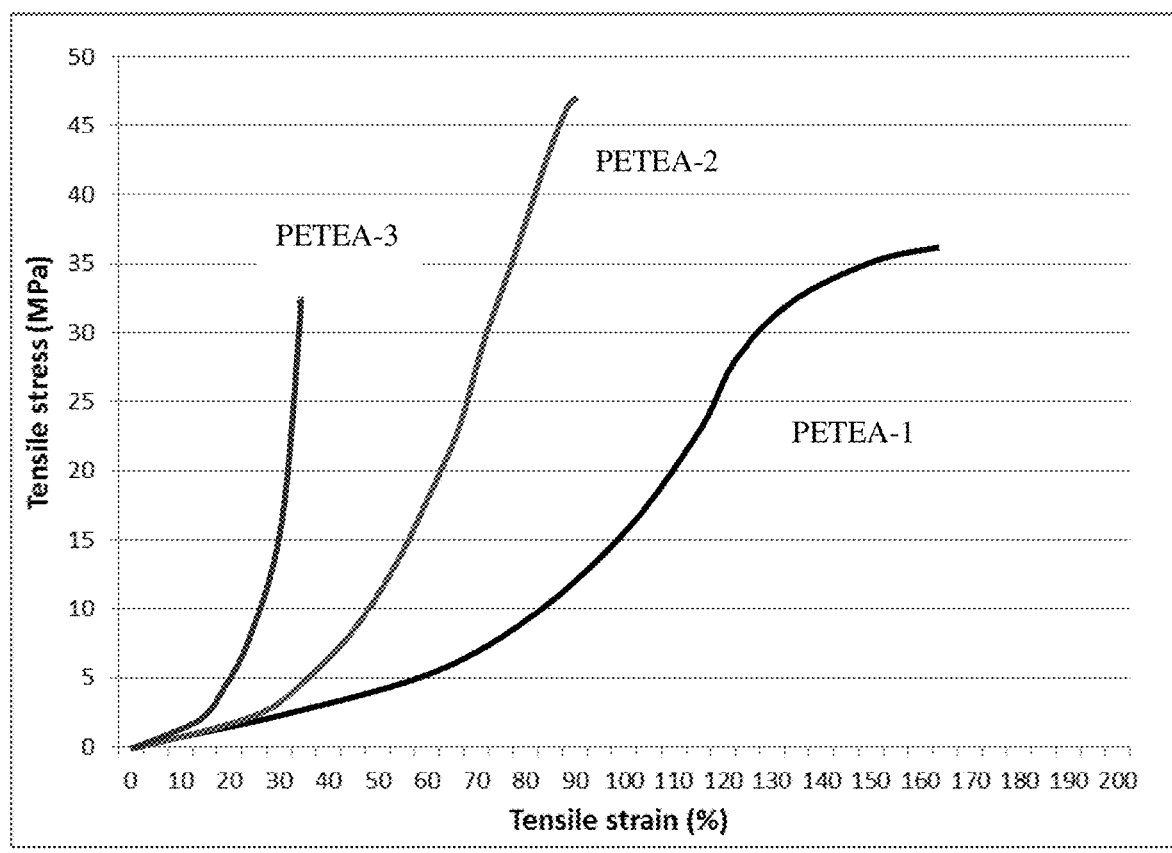
FIG. 7 Representative tensile stress-strain curves of three cross-linked PETEA polymers FIG. 8 The specific discharge capacity values of three Li—Se battery having a Se/CNT cathode active material featuring (1) ETPTA polymer-encapsulated Se/CNT particles, (2) carbon-encapsulated Se/CNT particles, and (3) un-protected Se/CNT particles, respectively.

The reacting mass, PETEA/AIBN (without cathode particles), was cast onto a glass surface to form several films, which were polymerized and cured to obtain cross-linked polymers having different degrees of cross-linking. Tensile testing was also conducted on these films and some testing results are summarized in FIG. 7. This series of cross-linked polymers can be elastically stretched up to approximately 25% (higher degree of cross-linking) to 80% (lower degree of cross-linking).

Example 10: The Preparation of ETPTA-Based High-Elasticity Semi-IPN Polymer

For the encapsulation of the various anode particles by the ETPTA semi-IPN polymer, the ETPTA (Mw=428 g/mol, trivalent acrylate monomer), EGMEA (Mw=482 g/mol, monovalent acrylate oligomer), and 2-hydroxy-2-methyl-1-phenyl-1-propanone (HMPP, a photoinitiator) were dissolved in a solvent (propylene carbonate, PC) to form a solution. The weight ratio between HMPP and the ETPTA/EGMEA mixture was varied from 0.2% to 2%. The ETPTA/EGMEA proportion in the solution was varied from 1% to 5% to generate different encapsulation layer thicknesses. The ETPTA/EGMEA ratio in the acrylate mixture was varied from 10/0 to 1/9.

The air-suspension coating method was used to encapsulate cathode active material (Se) particles into core-shell structures. The powder of core-shell particulates having a reacting mass of ETPTA/EGMEA/HMPP was then exposed to UV irradiation for 20 s. The UV polymerization/cross-linking was conducted using a Hg UV lamp (100 W), having a radiation peak intensity of approximately 2000 mW/cm$^2$ on the surfaces of the powder samples.

The above procedure produced Se-based particulates composed of various Se-conducting material particles encapsulated with a cross-linked ETPTA/EGMEA polymer shell. For comparison purposes, unprotected Se/conducting material particles and those protected by carbon coating (but no high-elasticity polymer encapsulation), respectively, were also prepared and implemented in a separate lithium-selenium cell.

Example 11: Effect of Lithium Ion-Conducting Additive on Lithium Ion Conductivity of High-Elasticity Polymers A wide variety of lithium ion-conducting additives were added to several different high-elasticity polymer matrix materials to prepare encapsulation shell materials for protecting core particles of an anode active material (Table 1). We have discovered that these polymer composite materials are suitable encapsulation shell materials provided that their lithium ion conductivity at room temperature is no less than 10$^{-6}$ S/cm. With these materials, lithium ions appear to be capable of readily diffusing in and out of the encapsulation shell having a thickness no greater than 1 μm. For thicker shells (e.g. 10 μm), a lithium ion conductivity at room temperature no less than 10$^{-4}$ S/cm would be required.

TABLE 1

Lithium ion conductivity of various high-elasticity polymer composite compositions as a shell material for protecting anode active material particles.

| Sample No. | Lithium-conducting additive | Polymer (1-2 μm thick) | Li-ion conductivity (S/cm) |
|---|---|---|---|
| E-1p | Li$_2$CO$_3$ + (CH$_2$OCO$_2$Li)$_2$ | 70-99% PVA-CN | 2.9 × 10$^{-4}$ to 3.6 × 10$^{-3}$ S/cm |
| E-2p | Li$_2$CO$_3$ + (CH$_2$OCO$_2$Li)$_2$ | 65-99% ETPTA | 6.4 × 10$^{-4}$ to 2.3 × 10$^{-3}$ S/cm |
| E-3p | Li$_2$CO$_3$ + (CH$_2$OCO$_2$Li)$_2$ | 65-99% ETPTA/EGMEA | 8.4 × 10$^{-4}$ to 1.8 × 10$^{-3}$ S/cm |
| D-4p | Li$_2$CO$_3$ + (CH$_2$OCO$_2$Li)$_2$ | 70-99% PETEA | 7.8 × 10$^{-3}$ to 2.3 × 10$^{-2}$ S/cm |
| D-5p | Li$_2$CO$_3$ + (CH$_2$OCO$_2$Li)$_2$ | 75-99% PVA-CN | 8.9 × 10$^{-4}$ to 5.5 × 10$^{-3}$ S/cm |
| B1p | LiF + LiOH + Li$_2$C$_2$O$_4$ | 60-90% PVA-CN | 8.7 × 10$^{-5}$ to 2.3 × 10$^{-3}$ S/cm |
| B2p | LiF + HCOLi | 80-99% PVA-CN | 2.8 × 10$^{-4}$ to 1.6 × 10$^{-3}$ S/cm |
| B3p | LiOH | 70-99% PETEA | 4.8 × 10$^{-3}$ to 1.2 × 10$^{-2}$ S/cm |
| B4p | Li$_2$CO$_3$ | 70-99% PETEA | 4.4 × 10$^{-3}$ to 9.9 × 10$^{-3}$ S/cm |
| B5p | Li$_2$C$_2$O$_4$ | 70-99% PETEA | 1.3 × 10$^{-3}$ to 1.2 × 10$^{-2}$ S/cm |

TABLE 1-continued

Lithium ion conductivity of various high-elasticity polymer composite compositions as a shell material for protecting anode active material particles.

| Sample No. | Lithium-conducting additive | Polymer (1-2 μm thick) | Li-ion conductivity (S/cm) |
|---|---|---|---|
| B6p | $Li_2CO_3$ + LiOH | 70-99% PETEA | $1.4 \times 10^{-3}$ to $1.6 \times 10^{-2}$ S/cm |
| C1p | $LiClO_4$ | 70-99% PVA-CN | $4.5 \times 10^{-4}$ to $2.4 \times 10^{-3}$ S/cm |
| C2p | $LiPF_6$ | 70-99% PVA-CN | $3.4 \times 10^{-4}$ to $7.2 \times 10^{-3}$ S/cm |
| C3p | $LiBF_4$ | 70-99% PVA-CN | $1.1 \times 10^{-4}$ to $1.8 \times 10^{-3}$ S/cm |
| C4p | LiBOB + $LiNO_3$ | 70-99% PVA-CN | $2.2 \times 10^{-4}$ to $4.3 \times 10^{-3}$ S/cm |
| S1p | Sulfonated polyaniline | 85-99% ETPTA | $9.8 \times 10^{-5}$ to $9.2 \times 10^{-4}$ S/cm |
| S2p | Sulfonated SBR | 85-99% ETPTA | $1.2 \times 10^{-4}$ to $1.0 \times 10^{-3}$ S/cm |
| S3p | Sulfonated PVDF | 80-99% ETPTA/ EGMEA | $3.5 \times 10^{-4}$ to $2.1 \times 10^{-4}$ S/cm |
| S4p | Polyethylene oxide | 80-99% ETPTA/ EGMEA | $4.9 \times 10^{-4}$ to $3.7 \times 10^{34}$ S/cm |

Example 12: Mixing of Selenium with Carbon/Graphite Particles Via Ball-Milling to Form Selenium-Containing Particles Selenium particles and particles of soft carbon (graphitizable disordered carbon), natural graphite, mesophase carbon, expanded graphite flakes, carbon nanofibers, and graphene sheets (0% to 95% by weight of Se in the resulting composite) were physically blended and then subjected to ball milling for 2-24 hours to obtain Se-containing composite particles (typically in a ball or potato shape). The particles, having a typical size of 1-10 containing various Se contents, were then embraced with a thin layer of high-elasticity polymer. Some of the resulting particulates were then made into a layer of cathode.

Example 13: Simple Selenium Melt or Liquid Solution Mixing

One way to combine selenium with a conducting material (e.g. carbon/graphite particles) is to use a solution or melt mixing process. Highly porous activated carbon particles, chemically etched mesocarbon microbeads (activated MCMBs), and exfoliated graphite worms were mixed with selenium melt at 222-230° C. (slightly above the melting point of Se, 221° C.) for 10-60 minutes to obtain selenium-impregnated carbon particles.

Example 14: Electrochemical Impregnation of Se in Various Porous Carbon/Graphite Particles The electrochemical impregnation of S into pores of activated carbon fibers, activated carbon nanotubes, and activated artificial graphite particles was conducted by aggregating these particles/fibers into a loosely packed layer. In this approach, an anode, electrolyte, and a layer of such a loosely packed structure (serving as a cathode layer) are positioned in an external container outside of a lithium-selenium cell. The needed apparatus is similar to an electroplating system, which is well-known in the art.

In a typical procedure, a metal polyselenide ($M_xSe_y$) was dissolved in a solvent (e.g. mixture of DOL/DME in a volume ratio from 1:3 to 3:1) to form an electrolyte solution. An amount of a lithium salt may be optionally added, but this is not required for external electrochemical deposition. A wide variety of solvents can be utilized for this purpose and there is no theoretical limit to what type of solvents can be used; any solvent can be used provided that there is some solubility of the metal polyselenide in this desired solvent. A greater solubility would mean a larger amount of selenium can be derived from the electrolyte solution.

The electrolyte solution was then poured into a chamber or reactor under a dry and controlled atmosphere condition (e.g. He or nitrogen gas). A metal foil was used as the anode and a layer of the porous structure as the cathode; both being immersed in the electrolyte solution. This configuration constitutes an electrochemical impregnation and deposition system. The step of electrochemically impregnating selenium into pores was conducted at a current density in the range from 1 mA/g to 10 A/g, based on the layer weight of the porous carbon/graphite particles/fibers.

The chemical reactions that occur in this reactor may be represented by the following equation: $M_xSe_y \rightarrow M_xSe_{y-z}$ + zSe (typically z=1-4). The selenium coating thickness or particle diameter and the amount of Se coating/particles impregnated may be controlled by the electrochemical reaction current density, temperature and time. In general, a lower current density and lower reaction temperature lead to a more uniform impregnation of Se and the reactions are easier to control. A longer reaction time leads to a larger amount of Se saturated in the pores. Additionally, the electrochemical method is capable of rapidly converting the impregnated Se into metal polyselenide (lithium polyselenide, sodium polyselenide, and potassium polyselenide, etc.).

Example 15: Chemical Reaction-Induced Impregnation of Selenium

A chemical impregnation method was herein utilized to prepare Se-impregnated carbon fibers that have been chemically activated. The procedure began with adding 0.58 g $Na_2Se$ into a flask that had been filled with 25 ml distilled water to form a $Na_2Se$ solution. Then, 0.72 g elemental Se was suspended in the $Na_2Se$ solution and stirred with a magnetic stirrer for about 2 hours at room temperature. The color of the solution changed slowly to orange-yellow as the selenium dissolved. After dissolution of the selenium, a sodium polyselenide ($Na_2Se_x$) solution was obtained ($4 \leq x \leq 10$).

Subsequently, a selenium-impregnated carbon fiber sample was prepared by a chemical impregnation method in an aqueous solution. First, 180 mg of expansion-treated carbon fibers was suspended in 180 ml ultrapure water with a surfactant and then sonicated at 50° C. for 5 hours to form a stable carbon fiber dispersion. Subsequently, the $Na_2Se_x$ solution was added to the above-prepared dispersions in the presence of 5 wt % surfactant cetyl trimethyl-ammonium bromide (CTAB), the as-prepared carbon fiber/$Na_2Se_x$ blended solution was sonicated for another 2 hours and then titrated into 100 ml of 2 mol/L HCOOH solution at a rate of 30-40 drops/min and stirred for 2 hours. Finally, the precipitate was filtered and washed with acetone and distilled water several times to eliminate salts and impurities. After filtration, the precipitate was dried at 50° C. in a drying oven for 48 hours. The reaction may be represented by the following reaction: $Se_x^{2-}+2H^+\rightarrow(x-1)Se+H_2Se$.

Example 16: Redox Chemical Reaction-Induced Impregnation of Selenium in Activated MCMBs and Activated Needle Coke In this chemical reaction-based deposition process, sodium thiosulfate ($Na_2Se_2O_3$) was used as a selenium source and HCl as a reactant. An activated MCMB-water or activated needle coke-water suspension was prepared and then the two reactants (HCl and $Na_2Se_2O_3$) were poured into this suspension. The reaction was allowed to proceed at 25-75° C. for 1-3 hours, leading to impregnation of S into pores of the activated structures. The reaction may be represented by the following reaction: $2HCl+Na_2Se_2O_3\rightarrow 2NaCl+Se\downarrow+SeO_2+H_2O$.

Example 17: Cycle Stability of Various Rechargeable Lithium-Selenium Battery Cells Several series of Li metal-selenium and Li-ion selenium cells were prepared using the presently prepared cathode layers. The first series is a Li metal cell containing a copper foil as an anode current collector and the second series is also a Li metal cell having a nanostructured anode of conductive filaments (based on electrospun carbon fibers or CNFs). The third series is a Li-ion cell having a nanostructured anode of conductive filaments (based on electrospun carbon fibers coated with a thin layer of Si using CVD) plus a copper foil current collector. The fourth series is a Li-ion cell having a prelithiated graphite-based anode active material as an example of the more conventional anode. We have found that after large numbers of charge/discharge cycles, the cells containing a nanostructured anode were essentially dendrite-free.

Charge storage capacities were measured periodically and recorded as a function of the number of cycles. The specific discharge capacity herein referred to is the total charge inserted into the cathode during the discharge, per unit mass of the composite cathode (counting the weights of cathode active material, conductive additive or support, binder, and any optional additive combined). The specific charge capacity refers to the amount of charges per unit mass of the composite cathode. The specific energy and specific power values presented in this section are based on the total cell weight. The morphological or micro-structural changes of selected samples after a desired number of repeated charging and recharging cycles were observed using both transmission electron microscopy (TEM) and scanning electron microscopy (SEM).

Figure 8:
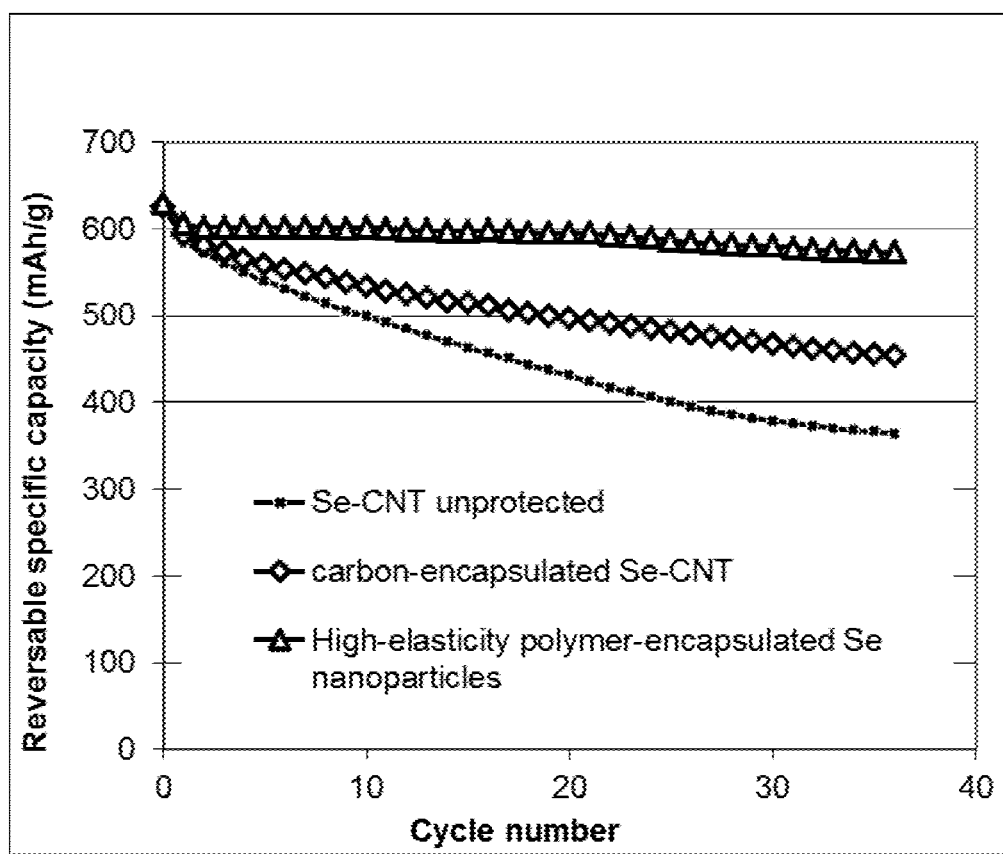

The cycling behaviors of 3 cells prepared in Example 10 are shown in FIG. 8, which indicates that high-elasticity polymer encapsulation of Se-based particles, with or without carbon coating, provides the most stable cycling response. Carbon coating alone does not help to improve cycling stability by much.

Figure 9:
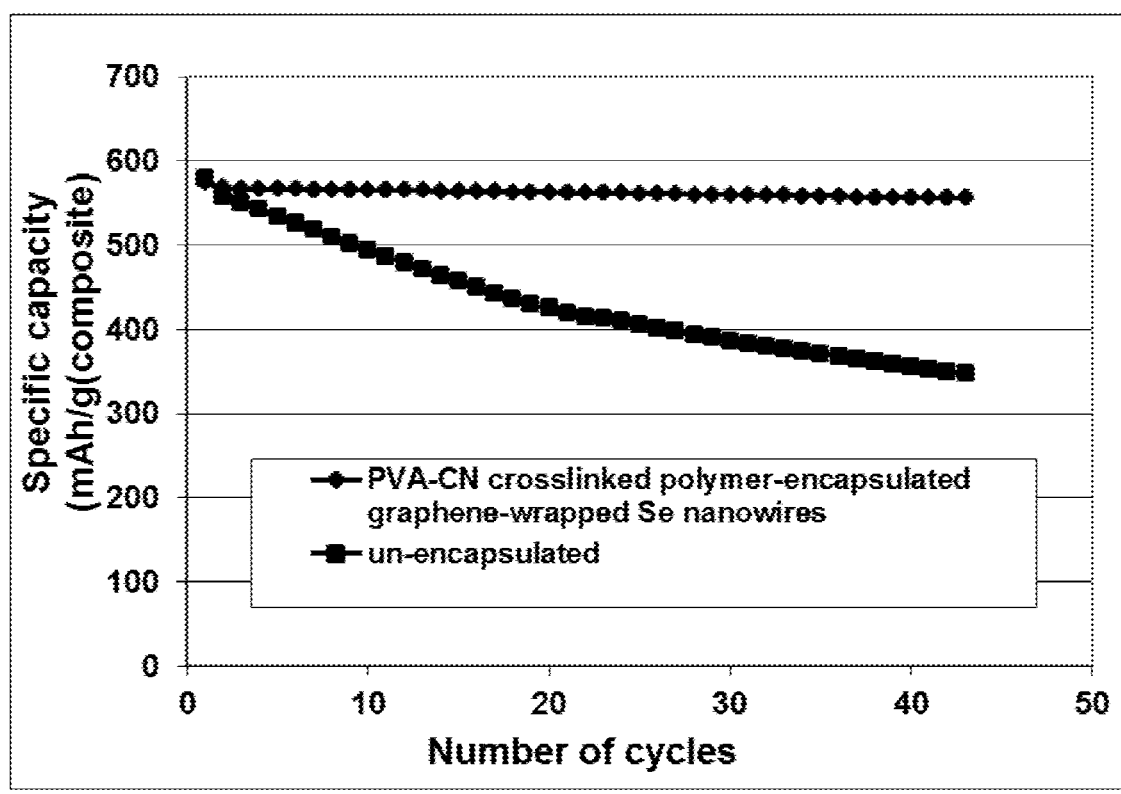
FIG. 9 The cycling behaviors of 2 Li—Se cells: one cell has a cathode containing particulates of cross-linked PVA-CN polymer-encapsulated selenium-CNT composite balls and the other cell has a cathode containing particulates of un-protected selenium-CNT composite balls.

Shown in FIG. 9 are the cycling behaviors of 2 Li—Se cells prepared in Example 9; one cell has a cathode containing particulates of cross-linked PVA-CN polymer-encapsulated selenium-CNT composite balls and the other cell has a cathode containing particulates of un-protected selenium-CNT composite balls. The high-elasticity polymer has imparted cycle stability to the Li—Se cell in a most dramatic manner.

Figure 10:
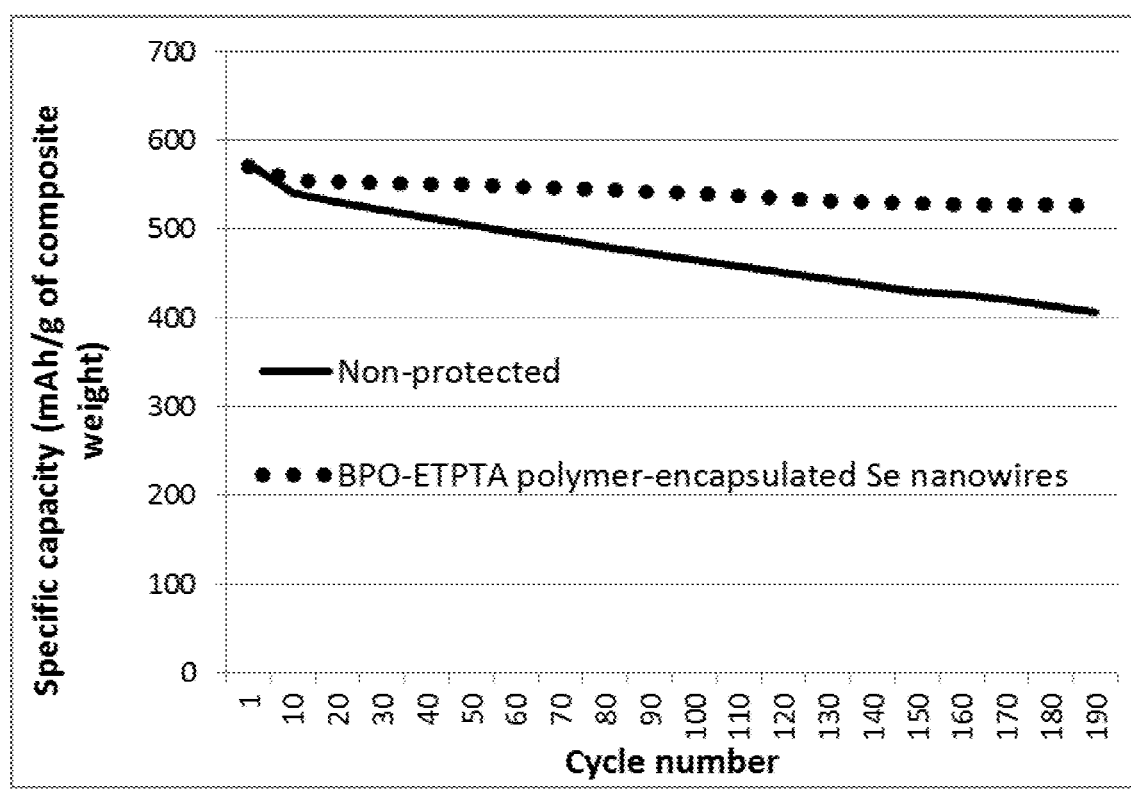
FIG. 10 The specific discharge capacity values of two Li—Se cells having a cathode active material layer featuring (1) high-elasticity cross-linked ETPTA polymer-encapsulated, selenium-MCMB (activated) composite particles; and (2) un-protected selenium-MCMB (activated) composite particles, respectively.

FIG. 10 shows the cycling behavior of two room-temperature Li—Se cell: one cell has a cathode containing particulates of cross-linked ETPTA polymer-encapsulated selenium-MCMB (activated) composite particles and the other cell has a cathode containing particulates of un-protected selenium-MCMB (activated) composite particles. Again, the high-elasticity polymer has significantly improved the cycle stability to the Na—Se cell.

The above cycling stability data have clearly demonstrated that the shuttling effect commonly associated with Li—Se cells has been significantly reduced or essentially eliminated by the presently invented high-elasticity polymer encapsulation approach.

Figure 11:
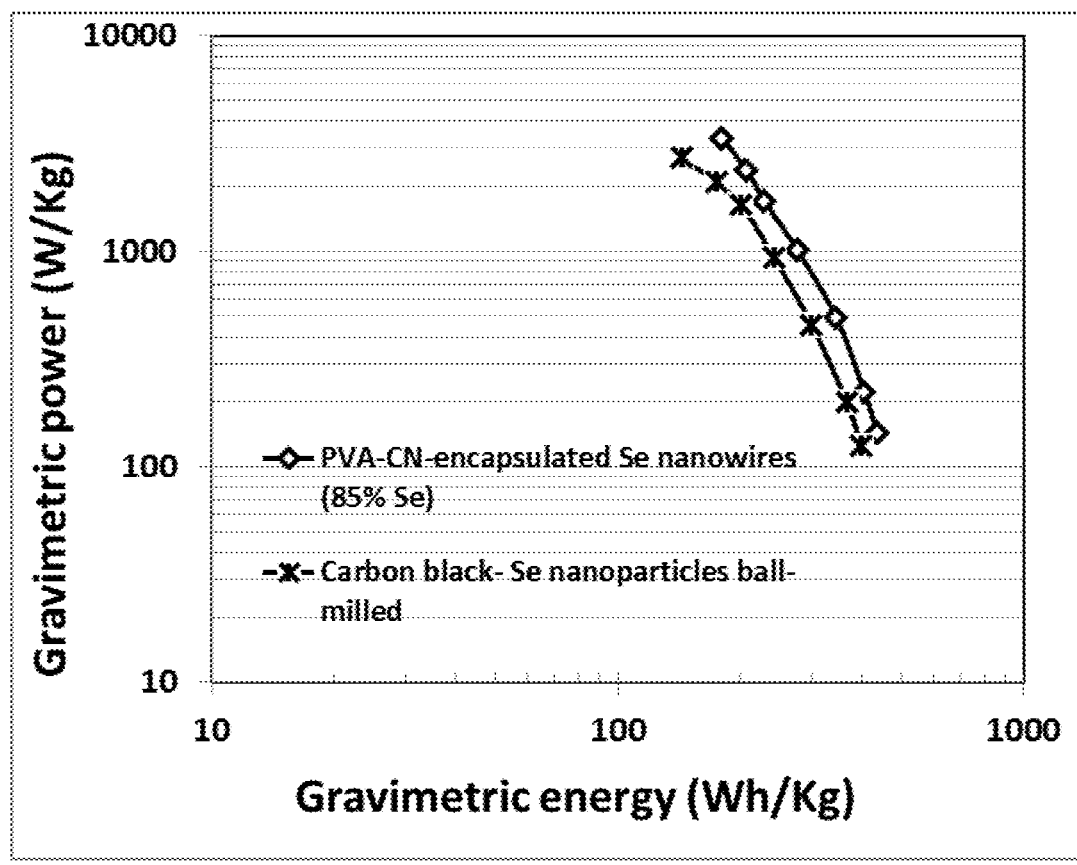
FIG. 11 Ragone plots (cell power density vs. cell energy density) of two Li metal-selenium cells: one featuring a cathode layer composed of high-elasticity polymer-encapsulated Se nanowires and the other a cathode of carbon black-Se nanoparticles ball-milled together.
Figure 12:
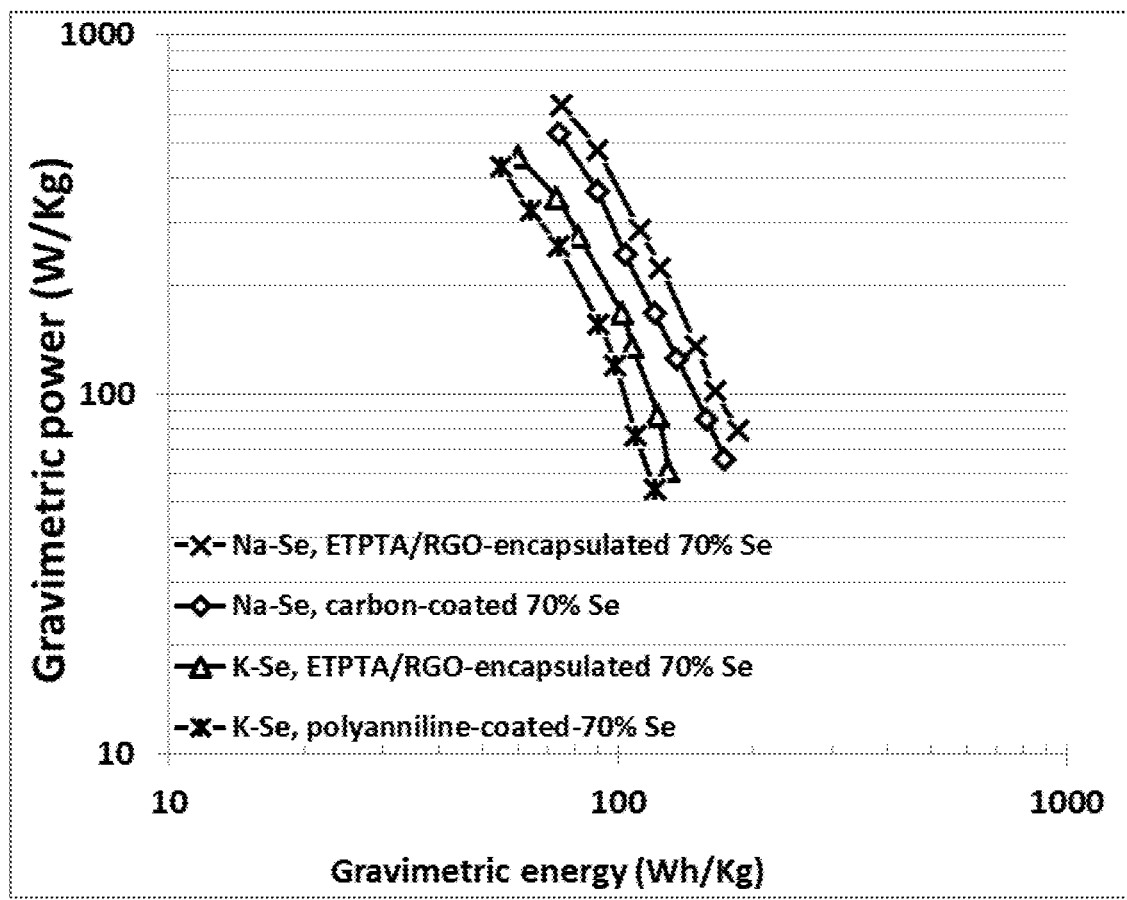
FIG. 12 Ragone plots (cell power density vs. cell energy density) of 4 alkali metal-selenium cells: Na—Se cell featuring high-elasticity polymer/RGO-encapsulated particles of selenium, Na—Se cell featuring carbon-coated Se particles, K—Se cell featuring high-elasticity polymer/RGO-encapsulated Se particles, and K—Se cell featuring polyaniline-coated Se particles.

FIG. 11 shows the Ragone plots (cell power density vs. cell energy density) of two Li metal-selenium cells: one featuring a cathode layer composed of high-elasticity polymer-encapsulated Se nanowires and the other a cathode of carbon black-Se nanoparticles ball-milled together. FIG. 12 shows the Ragone plots (cell power density vs. cell energy density) of 4 alkali metal-selenium cells: Na—Se cell featuring high-elasticity polymer/RGO-encapsulated particles of selenium, Na—Se cell featuring carbon-coated Se particles, K—Se cell featuring high-elasticity polymer/RGO-encapsulated Se particles, and K—Se cell featuring polyaniline-coated Se particles.

FIG. 11 and FIG. 12 indicate that the presence of a high-elasticity polymer embracing a selenium-based cathode active material does not compromise the energy density of an alkali metal-selenium cell based on the consideration that this polymer shell is normally less electron-conducting than a carbon coating and less ion-conducting than a liquid electrolyte. To the contrary, the energy density of the cell is actually improved, defying the expectations of materials scientists.

In lithium battery industry, it is a common practice to define the cycle life of a battery as the number of charge-discharge cycles that the battery suffers 20% decay in capacity based on the initial capacity measured after the required electrochemical formation. Summarized in Table 2 below are the cycle life data of a broad array of batteries featuring presently invented high-elasticity polymer-encapsulated selenium cathode particles vs. other types of cathode active materials.

TABLE 2

Cycle life data of various lithium secondary (rechargeable) batteries.

| Sample ID | Protective means | Type & % of anode active material | Initial capacity (mAh/g) | Cycle life (No. of cycles) |
|---|---|---|---|---|
| CNF-1 | PVA-CN encapsulation | 80% by wt. Se + 7% CNF + 3% PVA-CN + 5% binder + 5% CB | 532 | 1,725 |
| CNF-2 | Carbon encapsulation | 80% by wt. Se + 7% CNF + 3% carbon + 5% binder + 5% CB | 520 | 154 |
| AC-1 | No encapsulation | 70% Se + 15% AC + 8% binder + 7% CB | 452 | 176 |
| AC-2 | Encapsulated by PVA-CN (75%) + ethylene oxide (25%) | 70% Se + 15% AC + 3% polymer mixture + 5% binder + 7% CB | 455 | 1,650 |
| Gn-3 | ETPTA encapsulation | 90% S (coated on graphene sheets) | 601 | 1,155 |
| Gn-4 | Carbon encapsulation | 90% Se (coated on graphene sheets) | 488 | 182 |

TABLE 2-continued

Cycle life data of various lithium secondary (rechargeable) batteries.

| Sample ID | Protective means | Type & % of anode active material | Initial capacity (mAh/g) | Cycle life (No. of cycles) |
|---|---|---|---|---|
| CB-1 | No encapsulation | 70% Se + 22% CB + 8% binder | 453 | 66 |
| CB-2 | ETPTA/EGMEA encapsulation | 70% Se + 20% CB + 4% ETPTA/ EGMEA polymer + 6% binder | 460 | 1442 |

The following observations can be made from the data of Table 2 and FIG. 8-FIG. 12:

1) The presently invented approach also enables the Li—Se, Na—Se, and K—Se batteries to deliver high cycling stability.
2) The invented approach also leads to alkali metal-selenium batteries having exceptional energy densities and power densities. A cell-level energy density as high as 436 Wh/kg has been achieved with Li—Se cells featuring a cathode active material encapsulated by a high-elasticity polymer. Also quite surprisingly, the cell delivers a power density as high as 3321 W/kg, 4-5 times higher than the typical power density of lithium-ion batteries and that of conventional Li—Se cells. This power density improvement is very significant in light of the notion that Li—Se cells, being conversion-type cells, operate on some chemical reactions during charge/discharge and, hence, typically would be expected to deliver very low power densities (typically <<500 W/kg).
3) Similar advantageous features are also observed with Na—Se cells and K—Se cells. This is evidenced by FIG. 12, which shows the Ragone plots (cell power density vs. cell energy density) of 4 alkali metal-selenium cells:

In summary, the present invention provides an innovative, versatile, and surprisingly effective platform materials technology that enables the design and manufacture of superior alkali metal-selenium rechargeable batteries. The alkali metal-selenium cell featuring a cathode layer containing particulates of selenium particles encapsulated by a high-elasticity polymer exhibits a high cathode active material utilization rate, high specific capacity, high specific energy, high power density, little or no shuttling effect, and long cycle life. When a nanostructured carbon filament web is implemented at the anode to support a lithium film (e.g. foil), the lithium dendrite issue is also suppressed or eliminated.

The invention claimed is:

1. A method of manufacturing a rechargeable alkali metal-selenium cell, said method comprising:
   (a) providing a cathode and an optional cathode current collector to support said cathode;
   (b) providing an alkali metal anode and an optional anode current collector to support said anode; and
   (c) combining the anode and the cathode and adding an electrolyte in contact with the anode and the cathode to form said alkali metal-selenium cell;
   wherein said cathode contains multiple particulates of a selenium-containing material and
   wherein at least one of said particulates comprises one or a plurality of selenium-containing material particles being embraced or encapsulated by a thin layer of a high-elasticity polymer having a recoverable tensile strain from 5% to 1,000% when measured without an additive or reinforcement, a lithium ion conductivity no less than $10^{-7}$ S/cm at room temperature, and a thickness from 0.5 nm to 10 µm.

2. The manufacturing method of claim 1, wherein a separator is added to electrically separate the anode and the cathode.

3. The manufacturing method of claim 1, wherein said selenium-containing material is selected from a selenium-carbon hybrid, selenium-graphite hybrid, selenium-graphene hybrid, conducting polymer-selenium hybrid, a metal selenide, a Se alloy or mixture with Sn, Sb, Bi, S, or Te, a selenium compound, or a combination thereof.

4. The manufacturing method of claim 2, wherein said selenium-carbon hybrid, selenium-graphite hybrid, selenium-graphene hybrid, or conducting polymer-selenium hybrid is a mixture, blend, composite, chemically or physically bonded entity of selenium or selenide with a carbon, graphite, graphene, or conducting polymer material.

5. The rechargeable alkali metal-selenium cell of claim 1, wherein said high-elasticity polymer contains a cross-linked network of polymer chains having an ether linkage, nitrile-derived linkage, benzo peroxide-derived linkage, ethylene oxide linkage, propylene oxide linkage, vinyl alcohol linkage, cyanoresin linkage, triacrylate monomer-derived linkage, tetraacrylate monomer-derived linkage, or a combination thereof in said cross-linked network of polymer chains.

6. The manufacturing method of claim 1, wherein said high-elasticity polymer contains a cross-linked network of polymer chains having an ether linkage, nitrile-derived linkage, benzo peroxide-derived linkage, ethylene oxide linkage, propylene oxide linkage, vinyl alcohol linkage, cyanoresin linkage, triacrylate monomer-derived linkage, tetraacrylate monomer-derived linkage, or a combination thereof in said cross-linked network of polymer chains.

7. The manufacturing method of claim 1, wherein said high-elasticity polymer contains a cross-linked network of polymer chains selected from nitrile-containing polyvinyl alcohol chains, cyanoresin chains, pentaerythritol tetraacrylate chains, pentaerythritol triacrylate chains, ethoxylated trimethylolpropane triacrylate (ETPTA) chains, ethylene glycol methyl ether acrylate (EGMEA) chains, or a combination thereof.

8. The manufacturing method of claim 1, wherein said high-elasticity polymer has a thickness from 1 nm to 100 nm.

9. The manufacturing method of claim 1, wherein said high-elasticity polymer has a lithium ion conductivity or sodium ion conductivity from $1 \times 10^{-5}$ S/cm to $5 \times 10^{-2}$ S/cm.

10. The manufacturing method of claim 1, wherein said high-elasticity polymer has a recoverable tensile strain from 10% to 300%.

11. The manufacturing method of claim 1, wherein said providing multiple particulates includes encapsulating or embracing said one or a plurality of selenium-containing material particles with said thin layer of high-elasticity polymer using a procedure selected from pan coating, air suspension, centrifugal extrusion, vibrational nozzle, spray-drying, ultrasonic spraying, coacervation-phase separation, interfacial polycondensation, in-situ polymerization, matrix polymerization, or a combination thereof.

12. The manufacturing method of claim 1, wherein said providing multiple particulates includes encapsulating or embracing said one or a plurality of selenium-containing material particles with a mixture of said high-elasticity polymer with an elastomer, an electronically conductive polymer, a lithium-ion conducting material, a sodium ion-conducting material, a reinforcement material, or a combination thereof.

13. The manufacturing method of claim 11, wherein said lithium ion-conducting material is dispersed in said high-elasticity polymer and is selected from $Li_2CO_3$, $Li_2O$, $Li_2C_2O_4$, LiOH, LiX, $ROCO_2Li$, HCOLi, ROLi, $(ROCO_2Li)_2$, $(CH_2OCO_2Li)_2$, $Li_2S$, $Li_xSO_y$, or a combination thereof, wherein X=F, Cl, I, or Br, R=a hydrocarbon group, $0<x\leq1$ and $1\leq y\leq4$.

14. The manufacturing method of claim 11, wherein said lithium ion-conducting material is dispersed in said high-elasticity polymer and is selected from lithium perchlorate ($LiClO_4$), lithium hexafluorophosphate ($LiPF_6$), lithium borofluoride ($LiBF_4$), lithium hexafluoroarsenide ($LiAsF_6$), lithium trifluoro methanesulfonate ($LiCF_3SO_3$), bis-trifluoromethyl sulfonylimide lithium ($LiN(CF_3SO_2)_2$), lithium bis(oxalato)borate (LiBOB), lithium oxalyldifluoroborate ($LiBF_2C_2O_4$), lithium nitrate ($LiNO_3$), Li-fluoroalkyl-phosphates ($LiPF_3(CF_2CF_3)_3$), lithium bisperfluoro-ethysulfonylimide (LiBETI), lithium bis(trifluoromethanesulfonyl)imide, lithium bis(fluorosulfonyl)imide, lithium trifluoromethanesulfonimide (LiTFSI), an ionic liquid-based lithium salt, or a combination thereof.

15. The manufacturing method of claim 11, wherein said sodium ion-conducting material is dispersed in said high-elasticity polymer and is selected from $Na_2CO_3$, $Na_2O$, $Na_2C_2O_4$, NaOH, NaX, $ROCO_2Na$, HCONa, RONa, $(ROCO_2Na)_2$, $(CH_2OCO_2Na)_2$, $Na_2S$, $Na_xSO_y$, or a combination thereof, wherein X=F, Cl, I, or Br, R=a hydrocarbon group, $0<x\leq1$ and $1\leq y\leq4$.

16. The manufacturing method of claim 11, wherein said sodium ion-conducting material is dispersed in said high-elasticity polymer and is selected from sodium perchlorate ($NaClO_4$), sodium hexafluorophosphate ($NaPF_6$), sodium borofluoride ($NaBF_4$), sodium hexafluoroarsenide ($NaAsF_6$), sodium trifluoro methanesulfonate ($NaCF_3SO_3$), bis-trifluoromethyl sulfonylimide sodium ($NaN(CF_3SO_2)_2$), sodium bis(oxalato)borate (NaBOB), sodium oxalyldifluoroborate ($NaBF_2C_2O_4$), sodium oxalyldifluoroborate ($NaBF_2C_2O_4$), sodium nitrate, ($NaNO_3$), Na-fluoroalkyl-phosphates ($NaPF_3(CF_2CF_3)_3$), sodium bisperfluoro-ethysulfonylimide (NaBETI), sodium bis(trifluoromethanesulfonyl)imide, sodium bis(fluorosulfonyl)imide, sodium trifluoromethanesulfonimide (NaTFSI), an ionic liquid-based sodium salt, or a combination thereof.

17. The manufacturing method of claim 1, wherein said high-elasticity polymer contains from 0.1% to 50% by weight of a lithium ion-conducting additive or sodium ion-conducting additive dispersed therein, or contains therein from 0.1% by weight to 10% by weight of a reinforcement nanofilament selected from carbon nanotube, carbon nanofiber, graphene, or a combination thereof.

* * * * *